United States Patent
Davis et al.

(10) Patent No.: US 6,728,950 B2
(45) Date of Patent: Apr. 27, 2004

(54) METHOD AND APPARATUS FOR TRANSLATING BETWEEN SOURCE AND TARGET CODE

(75) Inventors: Alan L. Davis, Sugarland, TX (US); Jonathan F. Humphreys, Missouri City, TX (US); Todd M. Snider, Sugarland, TX (US); Raj Kanagasabai, Sugarland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 322 days.

(21) Appl. No.: 09/846,961

(22) Filed: May 1, 2001

(65) Prior Publication Data

US 2001/0018764 A1 Aug. 30, 2001

Related U.S. Application Data

(62) Division of application No. 09/429,339, filed on Oct. 28, 1999.
(60) Provisional application No. 60/106,243, filed on Oct. 29, 1998, provisional application No. 60/106,246, filed on Oct. 29, 1998, provisional application No. 60/106,242, filed on Oct. 29, 1998, provisional application No. 60/106,244, filed on Oct. 29, 1998, provisional application No. 60/106,245, filed on Oct. 29, 1998, and provisional application No. 60/106,247, filed on Oct. 29, 1998.

(51) Int. Cl.[7] .............................................. G06F 9/45
(52) U.S. Cl. ..................... 717/136; 717/137; 717/138; 717/139; 717/140; 717/144; 703/23; 703/26
(58) Field of Search ................................ 717/136–140, 717/146, 144, 134; 703/23, 26

(56) References Cited

U.S. PATENT DOCUMENTS

| | | | | |
|---|---|---|---|---|
| 4,841,476 A | * | 6/1989 | Mitchell et al. | 703/26 |
| 5,119,465 A | * | 6/1992 | Jack et al. | 717/137 |
| 5,339,413 A | * | 8/1994 | Koval et al. | 709/314 |
| 5,598,560 A | * | 1/1997 | Benson | 717/159 |
| 5,613,117 A | * | 3/1997 | Davidson | 717/144 |
| 5,742,848 A | * | 4/1998 | Burgess | 709/315 |
| 5,842,017 A | * | 11/1998 | Hookway et al. | 717/158 |
| 5,933,641 A | * | 8/1999 | Ma | 717/143 |
| 5,978,584 A | * | 11/1999 | Nishibata et al. | 717/134 |
| 6,075,937 A | * | 6/2000 | Scalzi et al. | 703/23 |
| 6,091,897 A | * | 7/2000 | Yates et al. | 717/138 |
| 6,463,582 B1 | * | 10/2002 | Lethin et al. | 717/158 |
| 6,477,641 B2 | * | 11/2002 | Davis et al. | 712/241 |
| 6,502,237 B1 | * | 12/2002 | Yates et al. | 717/136 |
| 6,535,903 B2 | * | 3/2003 | Yates et al. | 709/100 |

OTHER PUBLICATIONS

TITLE: A VLIW architecture for a trace scheduling compiler, author: Colwell et al, ACM, 1987.*
TITLE: Migrating a CISC computer family onto RISC via object code translation, author: Andrews et al, ACM, 1992.*
TITLE: Design of instruction set architectures for support of high–level languages author: Bose et al, ACM, 1984.*
TITLE: A language for writing code generators, author: C. W. Fraser, ACM, 1989.*
TITLE: The design of an instruction set for common LISP, author: Skef Wholey et al, ACM, 1984.*
TITLE: Common intermediate design language, author: Graves, H.; Polak, W.; IEEE, 1992.*

* cited by examiner

*Primary Examiner*—Chameli C. Das
(74) *Attorney, Agent, or Firm*—William W. Holloway; W. James Brady; Frederick J. Telecky, Jr.

(57) ABSTRACT

An interactive translation system (10) includes a front end (40), a back end (42), and a user interface (16). The front end (40) is operable to identify source elements (86) in a source file (24). The back end (42) is operable to generate a translation file having translation elements corresponding to translation of said identified source elements (86) and having an interface (16) for receiving inputs for modifying said translation.

13 Claims, 15 Drawing Sheets

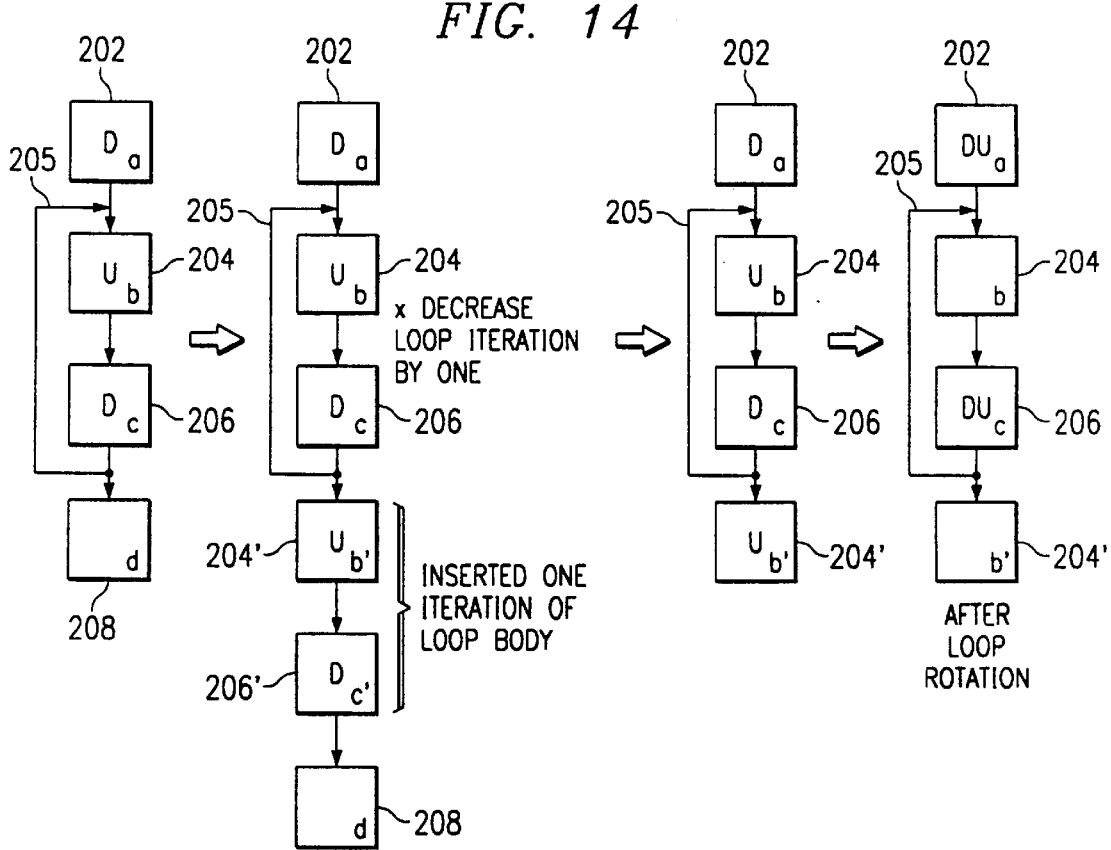

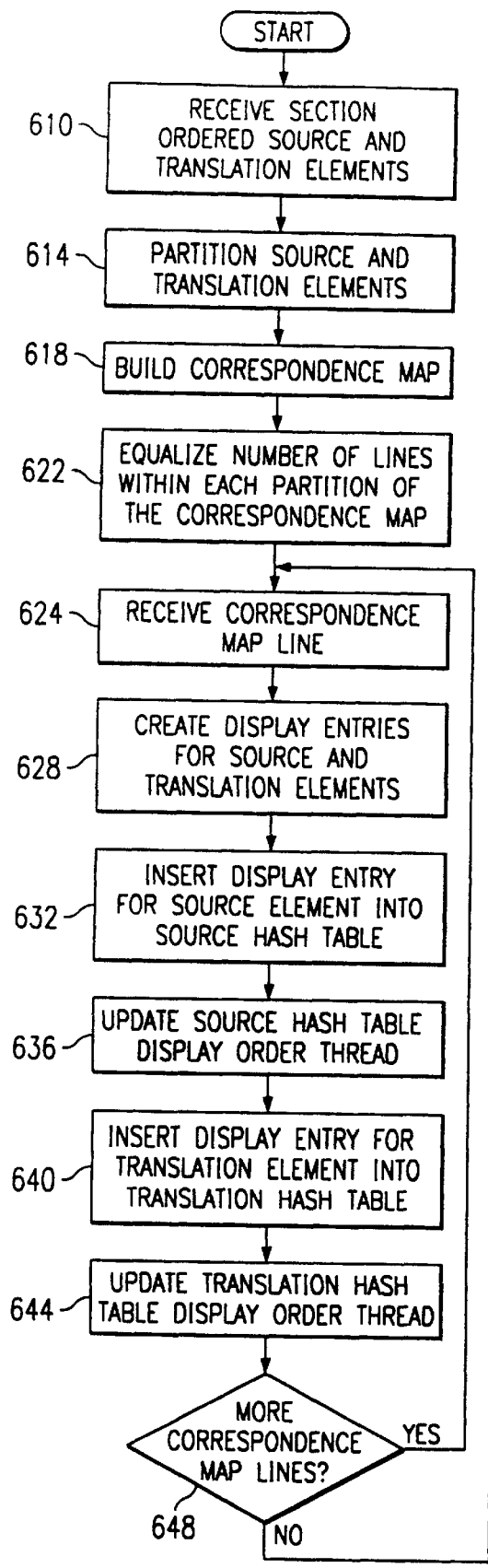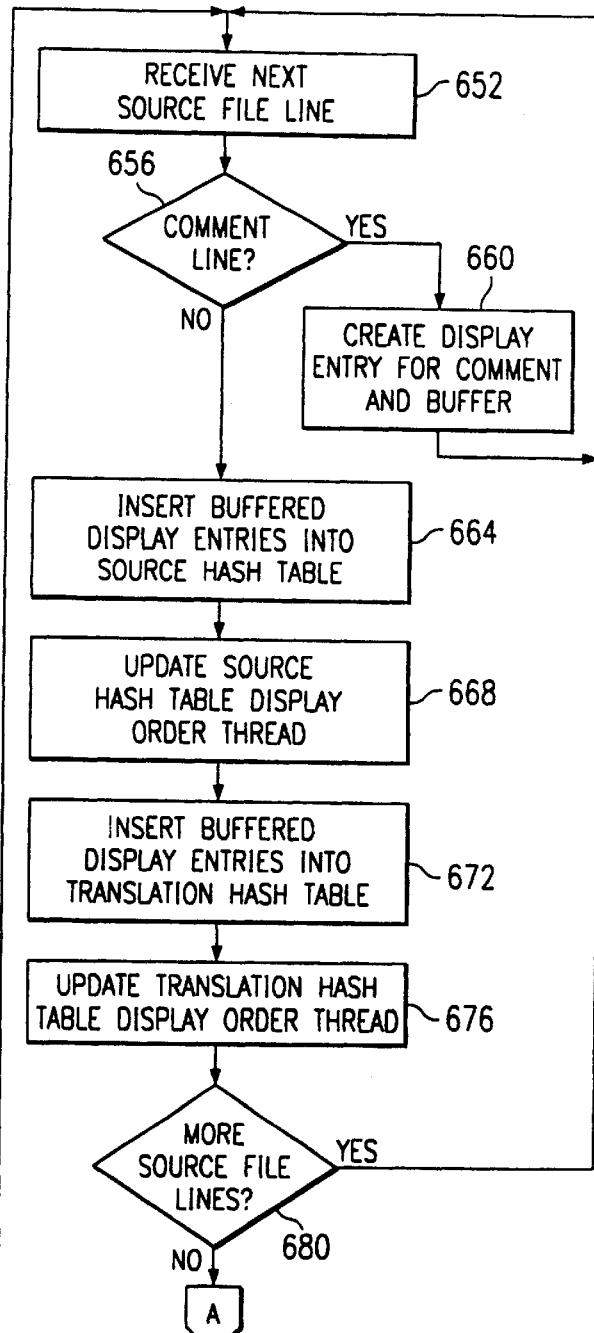
FIG. 19A

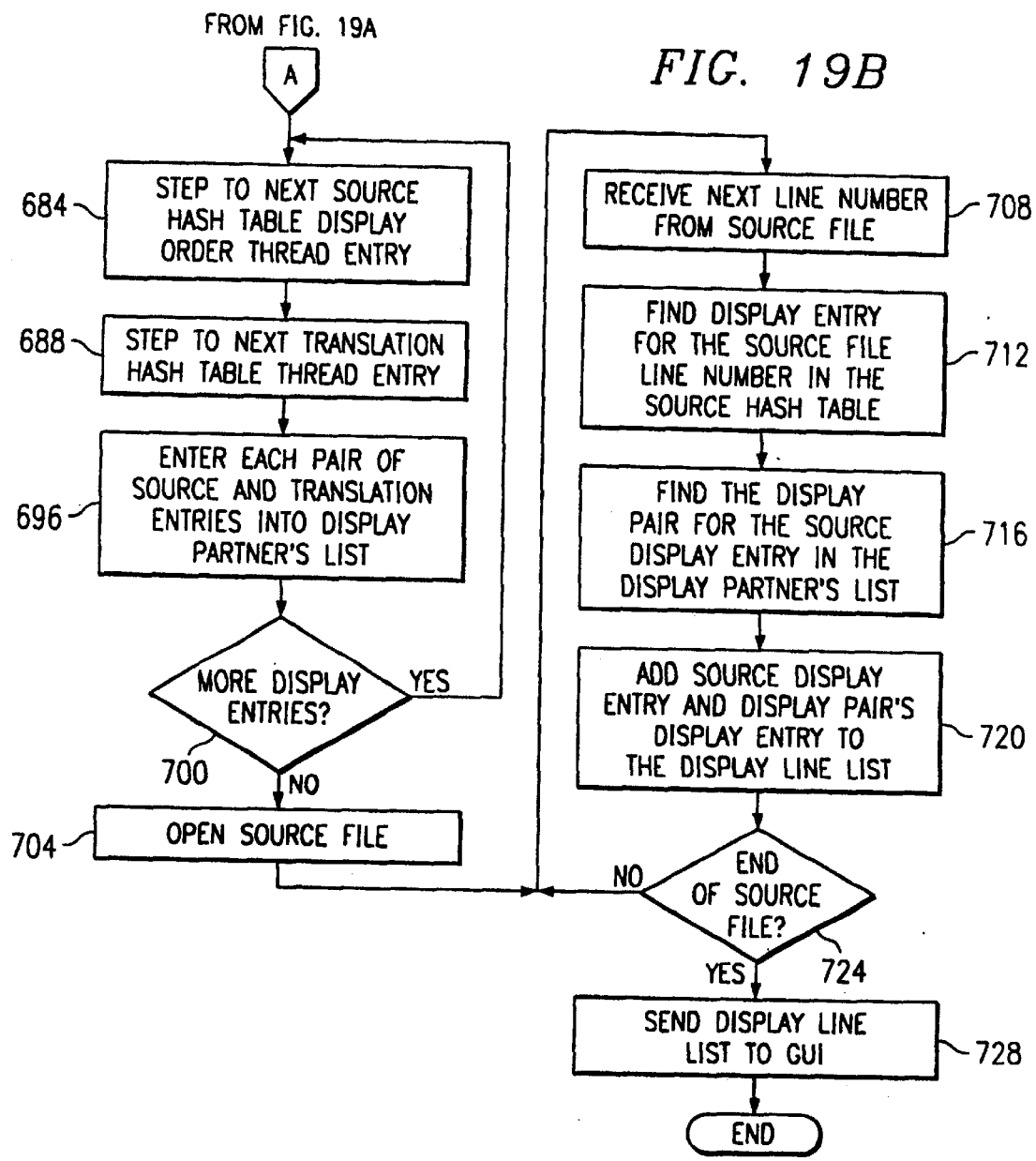

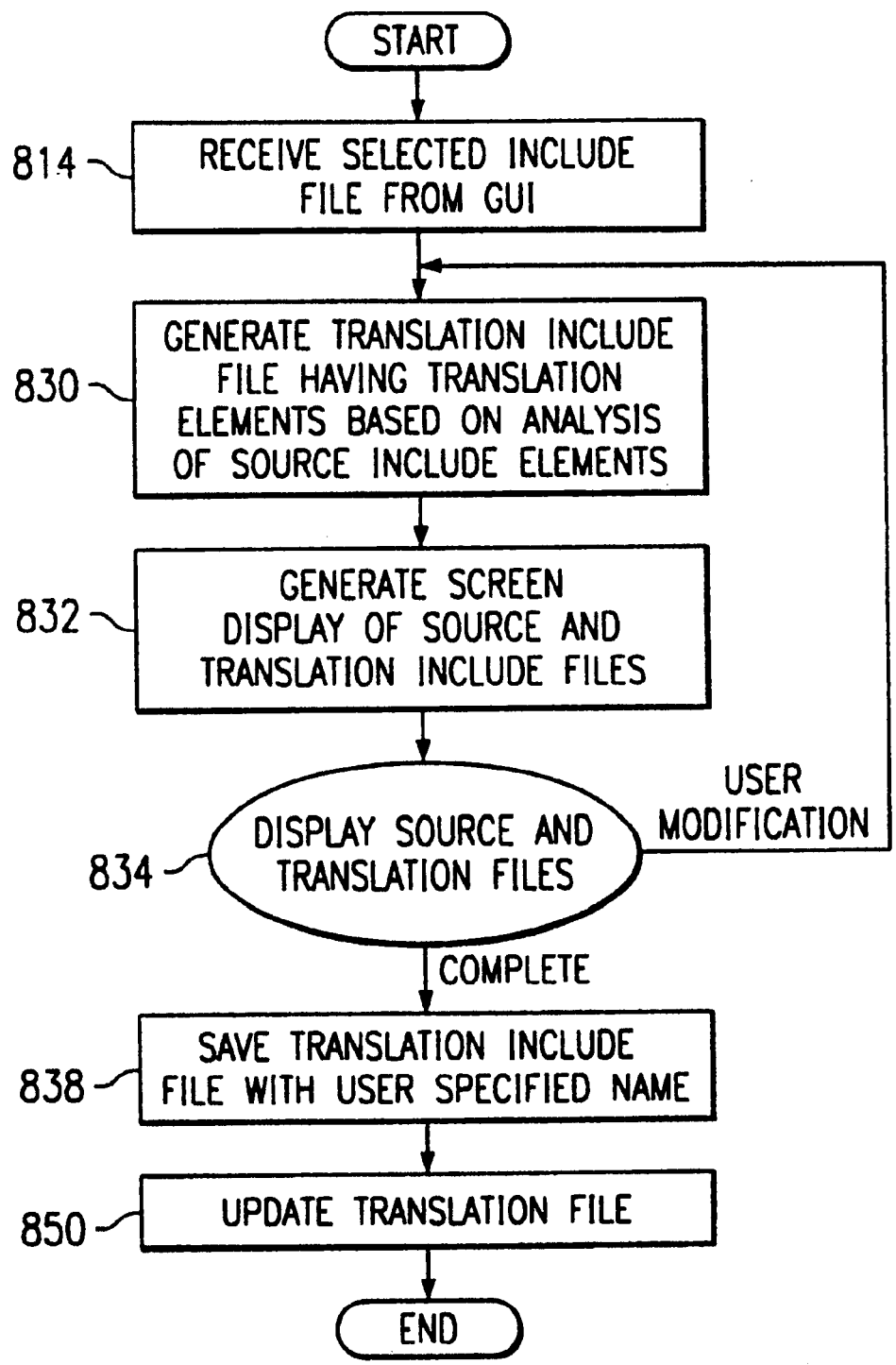

METHOD AND APPARATUS FOR TRANSLATING BETWEEN SOURCE AND TARGET CODE

This application is a division of application Ser. No. 09/429,339, filed Oct. 28, 1999.

This application claims priority under 35 USC §119(e)(1) Provisional Application Ser. No. 60/106,243, filed Oct. 29, 1998.

RELATED APPLICATIONS

This application is related to now abandoned U.S. Application Ser. No. 60/106,246 filed Oct. 29, 1998, "SYSTEM AND METHOD FOR GENERATING A TRANSLATION DISPLAY", now abandoned U.S. Application Ser. No. 60/106,242 filed Oct. 29, 1998, entitled "METHOD FOR TRANSLATING BETWEEN SOURCE AND TARGET CODE WITH HETEROGENEOUS REGISTER SETS", now abandoned U.S. Application Ser. No. 60/106,244, filed Oct. 29, 1998 entitled "SYSTEM AND METHOD FOR TRANSLATING INCLUDE FILES", now abandoned U.S. Application Ser. No. 60/106,245 filed Oct. 29, 1998, "METHOD AND APPARATUS FOR TRANSLATING BETWEEN SOURCE AND TARGET CODE" now abandoned U.S. Application Ser. No. 60/106,247 filed Oct. 29, 1998, "METHOD AND SYSTEM FOR DISPLAYING TRANSLATION INFORMATION". All related applications and this application are owned by a common Assignee.

TECHNICAL FIELD OF THE INVENTION

This invention relates generally to translation systems for computer programs, and more particularly to an interactive translation system and method.

BACKGROUND OF THE INVENTION

A digital signal processor (DSP) is a computer chip adapted for a particular purpose. DSPs are used to electronically process digitized analogue or digital signals. The signals may be voice, data, radio, or other similar signals. DSPs are often found in telephony systems, radio systems, CD players, computers, and TVs.

DSPs are typically programmed using assembly language. Assembly language is used because it allows for the creation of highly optimized programs for the DSP. Assembly language may also be used because of a lack of tools, such as compilers, available for the DSP. As new DSP chips replace older DSP chips, the assembly language used on the new DSP chips is often different from the assembly language used on the old DSP chips. Thus, in order to utilize new DSP chips, assembly language programs for old DSP chips must be rewritten for new DSP chips.

Rewriting an assembly language program from an old DSP chip to work on a new DSP chip is a tedious, time consuming and difficult process. Typically, the rewriting is done manually, with the programmer starting from scratch and writing the entire program for the new DSP chip, or by using simple tools, or by using simulators that run the old DSP program on the new DSP chip. These methods are problematic because they are slow and prone to inaccuracies or inefficiencies.

SUMMARY OF THE INVENTION

In accordance with the present invention, an interactive translation system and method are provided that substantially eliminate or reduce disadvantages and problems associated with previously developed translation or migration systems and methods. In particular, the interactive translation system and method combine static translation with an interactive environment in order to provide both accurate and efficient translations with minimal user intervention.

In one embodiment of the present invention, an interactive translation system includes a front end, a back end, and a user interface. The front end is operable to identify source elements in a source file. The back end is operable to generate a translation file having translation elements corresponding to translation of the identified source elements and having an interface for receiving inputs for modifying the translation.

More specifically, in accordance with one embodiment of the present invention, the source and translation files are assembly language files. In this and other embodiments, the source and the translation files may be for disparate source and target devices or disparate formats for a same device.

In another embodiment, a method for performing translation is provided. The method receives a source file and identifies source elements in the source file. The method generates a translation file having translation elements for a target device by performing a context-dependent translation of the source elements. The method displays the translation elements in an interface for receiving user inputs and in response to user inputs automatically regenerates selected translation elements based on the user input.

Technical advantages of the present invention include providing an improved translation system and method. In particular, the translation system and method combine static analysis of a source program with an interactive environment that prompts a user for information about the source program that is not statically determinable. The static analysis provides for efficient translation while the interactive environment provides information not available from static analysis. In this way, the translation is both accurate and efficient.

Other technical advantages will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings in which:

FIG. 14 is an exemplary diagram illustrating the transformation of loop elements in accordance with the method of FIG. 8;

FIGS. 19A and B are a flow diagram illustrating a method for generating a translation display in the display processor; and FIG. 20 is a flow diagram illustrating a method for translating include files for the translation system of FIG. 1.

DETAILED DESCRIPTION OF THE INVENTION

Figure 1:
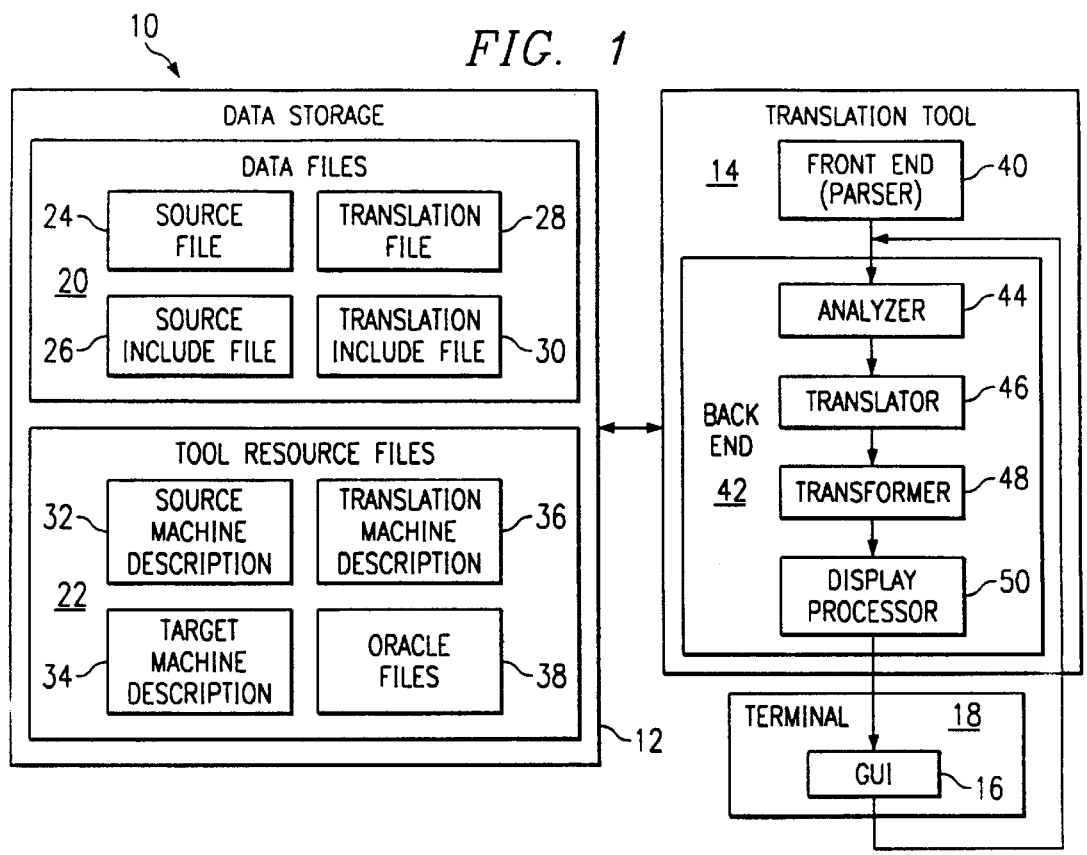
FIG. 1 is a block diagram illustrating a translation system in accordance with one embodiment of the present invention.

FIG. 1 illustrates a translation system 10 in accordance with one embodiment of the present invention. As described in more detail below, the translation system 10 combines static analysis of a source file with an interactive environment that prompts a user for information about the source file that is not statically determinable from the source file. In this way, both an efficient and accurate translation of the source file is provided.

Referring to FIG. 1, the translation system 10 includes a data storage 12, a translation tool 14, and a graphical user interface (GUI) 16. The data storage 12, translation tool 14, and graphical user interface 16 may reside on a single computer system or a distributed computer system. The computers may each be a personal computer, file server, work station, minicomputer, mainframe, or any other suitable device capable of processing information based on programming instructions. In a distributed embodiment, the data storage 12, translation tool 14, and graphical user interface 16 may be connected by a local area network (LAN) such as an Intranet, a wide area network (WAN) such as the Internet, or other suitable network.

The data storage 12, the translation tool 14, and the graphical user interface 16 include computer software and data that are loaded into system memory and executed by a microprocessor. The graphical user interface 16 is displayed on a terminal 18 that includes a processor and software, a keyboard, a monitor, and other suitable equipment to permit the user to enter data and changes. The computer software and data are generally identified by modules, interfaces, files, and the like that are stored and/or loaded into memory for processing. It will be understood that the computer software and data may be otherwise combined and/or divided for processing without departing from the scope of the present invention. Accordingly, the labels of the modules, interfaces, and files are for illustrative purposes and may be suitably varied. The computer software and files may when needed, be loaded into memory from disk storage (not shown). Disk storage may include a variety of types of storage media such as, for example, floppy disk drives, hard disk drives, CD-ROM drives, or magnetic tape drives. System memory may include one or more memory devices such as RAM, ROM, disk storage, and the like.

The data storage 12 includes data files 20 and tool resource files 22. Generally described, the data files 20 include source files 24, 26 that are processed by the translation tool 14 to generate translation files 24, 26. The tool resource files 22 include files used by the translation tool in processing the data files 20 that may be built into the tool 14 or separately loaded when needed.

The data files 20 include a source file 24, one or more source include files 26, a translation file 28, and one or more translation include files 30. The source file 24 includes a plurality of source elements that define operations of a source device. The source elements include source instructions, comments, directives, and the like. An instruction is an atomic command capable of being executed on a processing device, representing an operation to be performed. It includes an opcode, which specifies the operation to be performed, and operands, which specify objects on which the operation is to be performed. Comments are non-executable code that typically provide information about the purpose, effect, or use of instructions, set of instructions, file structure, and the like. Directives are non-executable statements that modify the interpretation of the instructions.

The source include files 26 are each called by the source file 24 to perform a predefined operation or set of operations. As used herein, each means each of at least a subset of the identified items. The include file 26 typically includes code to perform (or performs) an operation used by a number of files and is therefore most efficiently programmed as a separate file that can be used or called by any number of source files 24.

The translation file 28 is a translation of the source file 24. The translation file 28 includes translation elements that correspond to the source elements. A translation element or group of translation elements corresponds to a source element when it is translated, converted, or derived from or otherwise based upon a source element or group of source elements. The translation elements include instructions, comments, directives, and the like.

The translation include files 30 are each a translation of a source include file 26. The translation include files 30 are called by the translation file 28 the same way or in a similar way in which the source include files 26 are called by the source file 24.

The tool resource files 22 include a source machine description 32, a target machine description 34, a translation machine description 36, and oracle files 38. As described in more detail below, the tool resource files 22 are used by the translation tool 14 to translate the source file 24 and any source include files 26 into the translation file 28 and the translation include files 30.

The source machine description 32 is a model of the source device. The target machine description 34 is a model of the target device. In one embodiment, as described in more detail below, the models each describe the registers and the instructions and addressing modes of their associated device using abstractions that are independent of the device being described. The addressing modes are a means of specifying the operands in an instruction for a device.

Thus, the source machine description 32 defines instructions and operands for the source device. The target machine description 34 defines instructions and operands for the target device. The source and target machine descriptions 32 and 34 are modular in that each is used anytime a file is to be translated from or to their corresponding device; that is, a machine description may be used as a source or target machine description.

The translation machine description 36 provides translation between the source and target machine descriptions 32 and 34. As described in more detail below, the translation machine description 36 maps instructions and their associated operands from the source files 24 and 26 to the translation files 28 and 30. The translation machine description 36 is a specially designed model that describes the translation between specific source and target machine description files 32 and 34.

The oracle files 38 provide for customization of the translation tool 14. The oracle files 38 are used to describe device characteristics not modeled by the machine descriptions 32, 34, and 36. In one embodiment, the oracle files are device dependent. In this and other embodiments, an oracle file 38 may be loaded and used by the analyzer, translator, transformer, or display processor of the translation tool 14 to aid translation.

In one embodiment of the present invention, the translation system 10 translates between assembly language files. In this embodiment, the source and translation files 24, 26, 28, and 30 are assembly language files. The machine description and oracle files 32, 34, 36, and 38 are preferably models represented in some high-level language or in some language specifically designed for modeling a processor. Preferably, they are compiled and linked into the tool 14, although clearly they may also be separately loaded. Assembly language is a programming language in which there is generally a one-to-one correspondence between statements expressed in the language and executable instructions of a processing device. Assembly language is used for programming digital signal processors (DSP) and other suitable devices.

In the assembly language embodiment, the translation system 10 may convert an assembly language file for one device into an assembly language file for another device or convert a linear assembly language file into a scheduled assembly language file for a same or different device. A linear assembly language is a programming language in which there is a one-to-one correspondence between statements expressed in the language and executable instructions of an abstract processing device. The instructions of the abstract device represent those of an actual device, except in the abstract device all of the operations represented by any given instruction are completed before any of those for a subsequent instruction. Scheduled assembly language is an assembly language for an actual device, in which the execution of the instructions may overlap in such a way that some or all of the operations represented by any given instruction may not complete before those of a subsequent instruction. The translation system 10 may be used to convert other low-level or suitable programming files from operation on a first device to operation on a second device or from a first format to a second format for a same or different device.

Thus, the present invention provides a translation system using a computer capable of executing a program and an interactive program for translating code for a first processor into code for a second processor and capable of being executed on the computer.

The translation tool 14 includes a front end 40 and a back end 42. Generally described, the front end 40 performs preprocessing functions that convert data and information into internal representations that can be conveniently processed by the back end 42 or other part of the translation tool 14. The front and back ends 40 and 42 may be part of a same program, each be a separate program, set of programs, or part of one or more programs, partially combined and separated between any number of programs, and the like.

The front end 40 is operable to identify instructions and other source elements in the source file 24. In one embodiment, the front end 40 includes a parser that steps through the source file 24 and generates a list of discrete source elements. As previously described, the elements include instructions, directives, and comments of the source file 24. The discrete elements are passed to the back end 42 for translation and other suitable action. In one embodiment, the front end 40 is further operable to reorder the source elements into logical sections of related elements for internal analysis and processing. In this embodiment, the discrete elements are passed to the back end 42 and processed as a logical section. A section is a logical sequence of instructions that form an independent thread of processing and may contain calls or branches, but remains coherent during loading and execution of the source file. After processing, the elements are returned to original source order for display to a user.

In one embodiment, the back end 42 includes an analyzer 44, a translator 46, a transformer 48, and a display processor 50. The analyzer 44 analyzes the source elements and divides them into basic blocks. A basic block is a maximal length sequence of code where execution (control) only enters from the beginning of the sequence and only exits from the end of the sequence. The analyzer 44 also receives user input via the graphical user interface 16 and reanalyzes the source elements in response to any user input. The analyzer 44 passes the results of its analysis to the translator 46. One analysis is to track values in source registers to determine their value when the source program executes. Another analysis determines lifetimes of registers accessed in source elements.

The translator 46 translates the source elements identified by the analyzer 44 into translation elements. As described in more detail below, the translator 46 utilizes the source, target, and translation machine descriptions 32, 34, and 36 to match instructional and operand patterns between the source and target devices. In this way, the translator 46 efficiently maps source instructions to translation instructions without the need for customized coding for the source and target devices. The translator 46 generates an initial translation that is passed to the transformer 48 for further processing and communicates with the graphical user interface 16 via messages.

The transformer 48 provides fix-ups and optimization for the initial translation generated by the translator 46. As described in more detail below, for example, the transformer 48 identifies and manipulates loops to aid the translation process. The transformer 48 also allocates registers to temporary variables introduced by the translation and schedules translation instructions for the target processor. The transformer 48 passes an intermediate translation including the fix-ups and optimization to the display processor 50. The transformer 48 also communicates with the graphical user interface 16 via messages.

The display processor 50 receives the source file and the initial and the intermediate translations and generates a display of the source and translation files that is output to the graphical user interface 16. As used herein, identified files, data, and information include those files, data, or information, any representations of or based on those files, data, or information, and any previous or subsequent forms of those files, data, or information.

In one embodiment, as described in more detail below, the display processor 50 builds a display in which corresponding groups of elements in the source and translation files are aligned, in which source and corresponding translation instructions are associated with each other, and in which the source and translation files are displayed side-by-side. The display is passed to the graphical user interface 16 for display to the user.

The graphical user interface 16 displays the source and translation files to the user for review and modification. The graphical user interface 16 passes user modification back to the translation tool 14 for reanalysis, retranslation, and other appropriate action. The user modifications include any user input operable to modify the translation, the translation process, and the like. Once the user is satisfied with the translation, the then existing intermediate translation is saved as the translation file 28.

Figure 2:
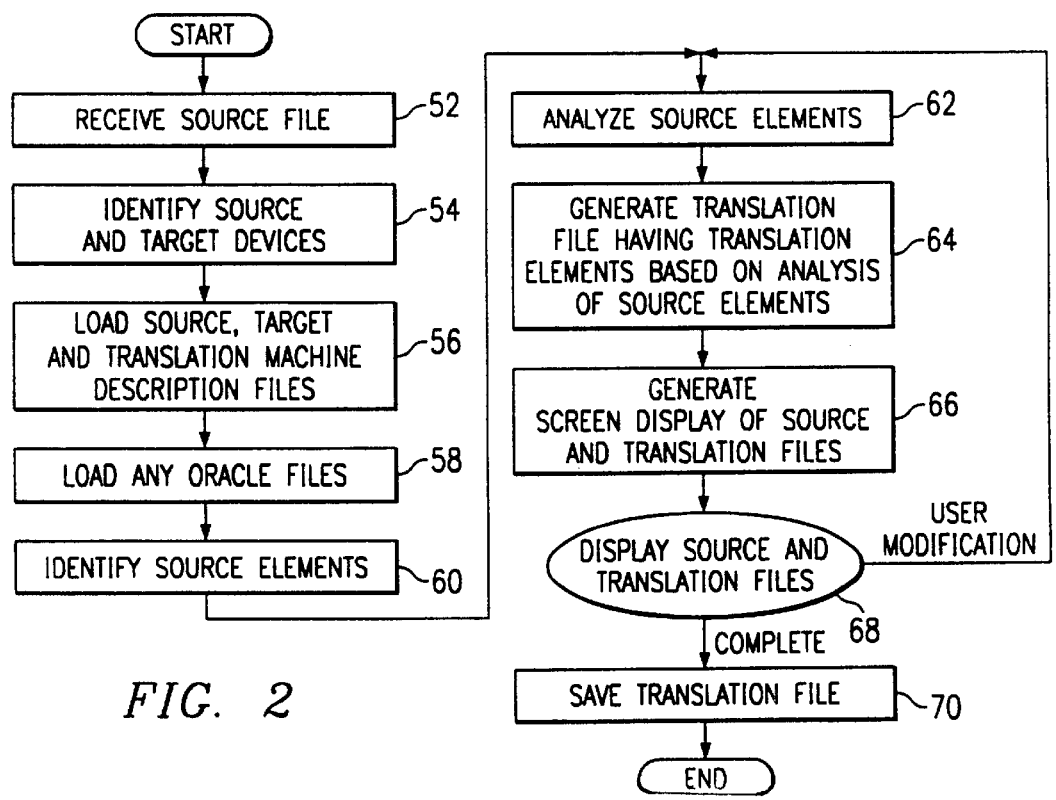
FIG. 2 is a high-level flow diagram illustrating an operation of the translation system of FIG. 1.

FIG. 2 is a high-level flow diagram illustrating operation of the translation system 10 in accordance with one embodiment of the present invention. It will be understood that the translation process may include other or different operations in the same or a different order.

Referring to FIG. 2, the source file 24 is received by the translation tool 14 at step 52. Next, at step 54, the source and target devices are identified for or by the translation tool 14. The source and target devices may be identified by a user or based on other information provided to the translation tool 14. Proceeding to step 56, the translation tool 14 loads the source, target, and translation machine descriptions 32, 34, and 36 for the source and target devices. Any oracle files 38 for a target or source for the translation tool 14 are loaded at step 58.

At step 60, the front end 40 of the translation tool 14 identifies source elements in the source file 24. The source elements are statically analyzed by the analyzer 44 at step 62. Next, at step 64, a translation file is generated having translation elements by performing context-dependent translation of the source elements. The translation is performed by the translator 46 with fix-ups and optimizations performed by the transformer 48.

Proceeding to step 66, a screen display of the source and translation files is generated by the display processor 50 of the translation tool 14. Next, at state 68, the source and translation files are displayed by the graphical user interface 16 for review and modification by the user. In response to user modifications received by the graphical user interface 16, state 68 returns to step 62 in which the source elements are reanalyzed and retranslated based on the user modification.

After the user is satisfied with the translation, state 68 leads to step 70 in which the intermediate translation file being reviewed by the user is saved as the final translation file 28. Step 70 leads to the end of the process. Accordingly, the translation tool 14 automatically translates the source file 24 based on a static analysis and displays the translation to the user for review and modification. As used herein, an event is automatic in that the event is predefined and carried out by the computer process. The event may be immediate or in response to a user action or other suitable event. In this way, the source file 24 is efficiently and accurately translated into the translation file 28.

Figure 3:
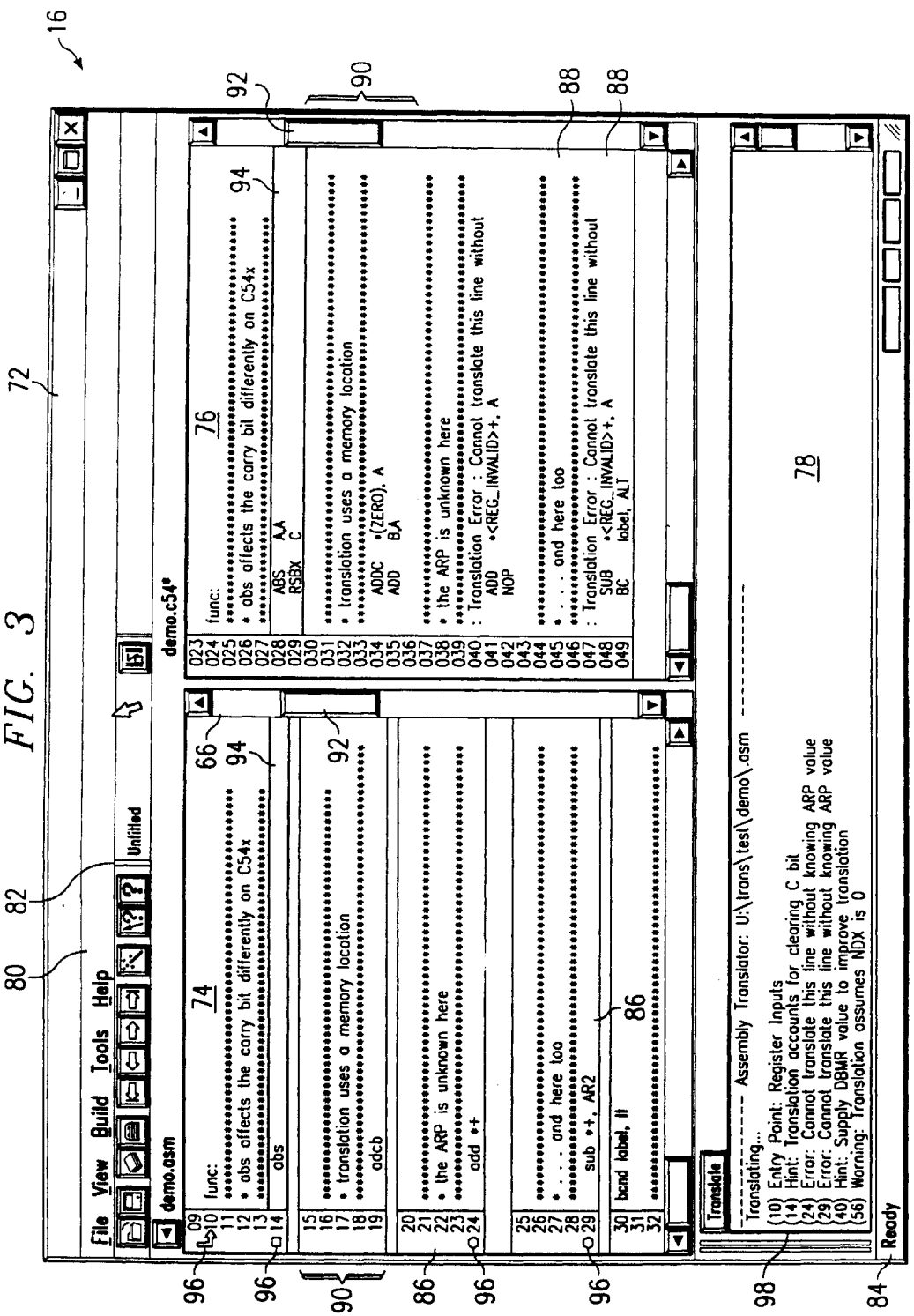
FIG. 3 is a screen display illustrating details of a graphical user interface for the translation system of FIG. 1.

FIG. 3 is a screen display illustrating one embodiment of the graphical user interface 16. As described in more detail below, the graphical user interface 16 provides an intuitive interface for the user to review, modify, and save a translation 28, 30.

Referring to FIG. 3, the graphical user interface 16 includes software programs operating on the monitor, a graphical interface window 72 having a source window 74, a translation window 76, and an output window 78. The graphical interface window 72 includes a menu bar 80 with a variety of pull down menus disposed along the top edge of the window 72. A toolbar 82 is disposed immediately below the menu bar 80. A status bar 84 is disposed along the bottom edge of the window 72.

Using the menu bar 80 or other commands, the user may specify certain global information that can be used by the translation process. For example, a user may specify a compatibility mode, assumptions about status bits, and register liveness at entry points, at exit points, and at function call sites. This information is used each time a particular translation issue is encountered, reducing the need for user interaction.

The toolbar 82 includes a plurality of arrow icons that allow the user to quickly traverse through errors or other issues within the source and translation windows 74 and 76. In one embodiment, the arrows may traverse the user to the first, previous, next, and last error or issue for a translation.

The source window 74 displays the source elements 86 while the translation window 76 displays the translation elements 88. For the embodiment of FIG. 3, the source and translation windows 74 and 76 are displayed side-by-side to allow simultaneous viewing of the source and translation elements 86 and 88 by the user. In addition, corresponding groups of elements 90 are aligned in the source and display windows 74 and 76 to allow simultaneous viewing of source elements 86 and their translations 88. Synchronized scroll bars 92 are provided for the windows 74 and 76 to maintain alignment during any review and modification by the user. In response to a user selection of an element, the corresponding source and translation elements 94 are highlighted. Thus, the user is immediately informed of the translation corresponding to any source element 86. Similarly, a translation element 88 may be immediately identified with its source element 86.

The graphical user interface 16 marks problematic or other elements for which review or additional information is indicated in one of the source and translation windows 74 and 76 with a status icon 96. In one embodiment, the source window 74 icons include a red octagon for an error situation, a yellow diamond for a warning situation, a green square for an efficiency situation, and a green arrow for a linkage situation, all as depicted in FIG. 3. In this embodiment, the red octagon indicates an error situation where the translation is known to be incorrect, impossible, or beyond the limits of the translator 14. The user is prompted to supply information to allow a correct translation to be produced. The yellow diamond icon indicates a warning situation where the translation is probably correct, but depends on a particular assumption. The user may confirm or deny the assumption. The green square indicates an efficiency situation where the translation is correct, but could be improved with additional information. The user is prompted to provide the information to improve efficiency of the translation. Such information may be "global" in the sense that it is effective for the entire translation and not just for an identified source or target element. The green arrow indicates a linkage point situation, such as a call or branch, where the translation depends on whether one or more registers are live at a particular point in the file. A register is live if it currently contains a value that will subsequently be used in another instruction. It will be understood that other or different status icons 96 may be used by the translation system to prompt the user for information that is needed or would improve translation.

The output window 78 contains a listing of error or issue lines 98 to be reviewed and/or resolved by the user. This separate listing allows the user to quickly determine the number and type of issues to be resolved. Each listing 98 in the output window 78 provides a source line number and a description of the error or issue to be resolved. Clicking on the error or issue line 98 will allow the user to move the display to the appropriate place in the source and translation windows 74 and 76.

Figure 4:
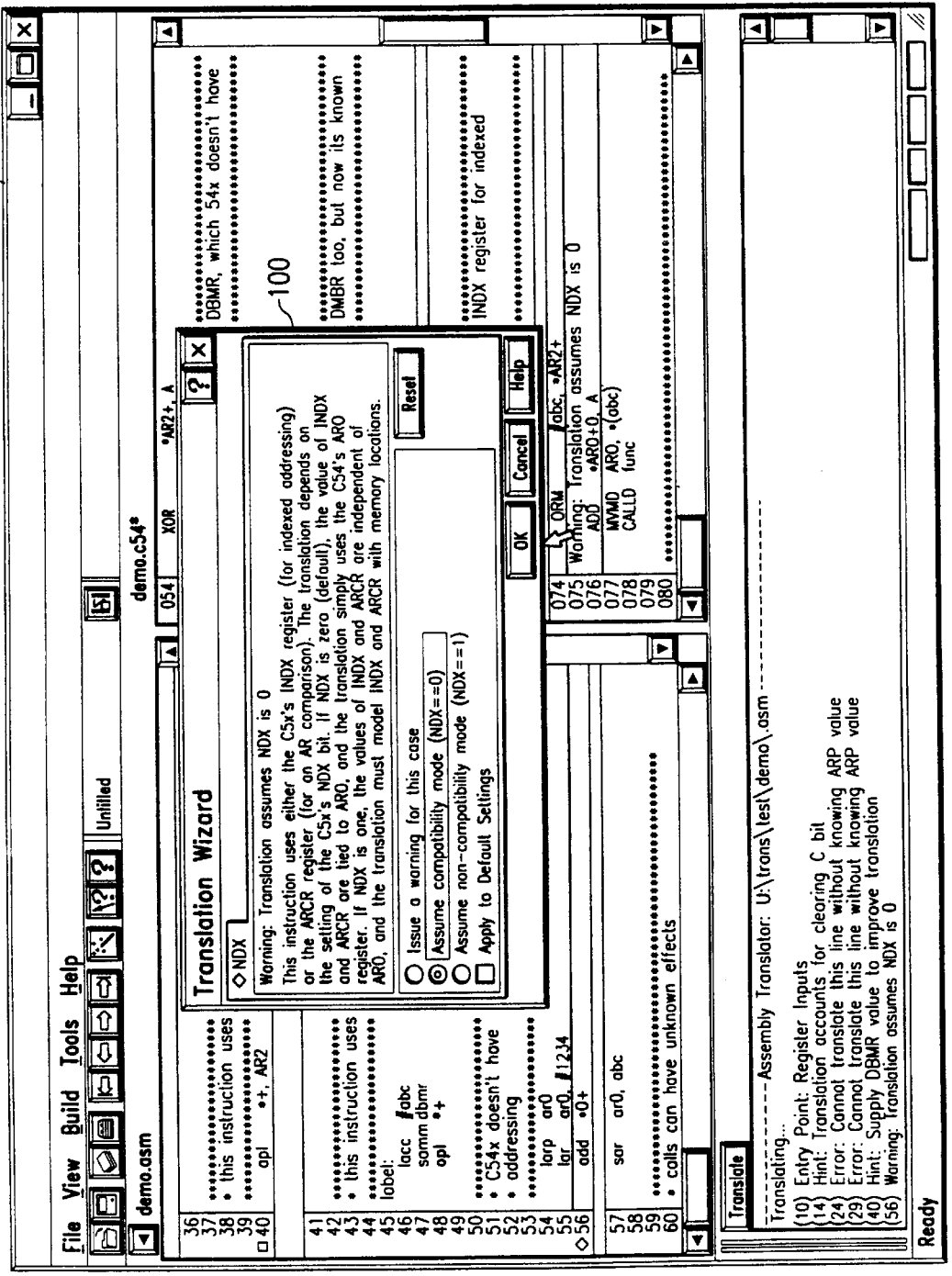
FIG. 4 is a screen display illustrating a translation wizard for the graphical user interface of FIG. 3.

FIG. 4 illustrates a translation wizard 100 for assisting the user in resolving translation errors or issues. Referring to FIG. 4, the translation wizard 100 provides a dialog box that explains a selected translation issue with the line in question and allows the user to respond with information and guidance to the translator. Accordingly, a user is assisted with translation errors or issues to maximize translation efficiency while ensuring that the translation is accurate. Quantifications to a translation or additional information to aid the translation process is passed by the graphical user interface 16 back to the translation tool 14 where the translation is regenerated based on the user input. Accordingly, the translation is continually updated during interaction with the user. After the translation is completed, the user saves the translation as the translation file 28. The translation file 28 may then be loaded onto the target device for operation.

The actual translation between a source code and a target code requires the interpretation of a source command set into a translation command set. Any given computer language, including assembly language, includes a set of operation commands, often called opcodes. An example of an opcode is MULT which is a command to multiply. Different opcodes may exist between one set of assembly language instructions and another set of assembly language instructions. This means that for a given assembly language, its opcodes may differ from the target's assembly language opcodes. Indeed, one opcode in a source assembly language may translate to many different opcodes in a target assembly language. Alternatively, many source assembly language opcodes may translate to a single target assembly language opcode, or there may be a many-to-many relationship between source and target opcodes. Associated with each opcode, in general, is a corresponding operand. An operand is the argument (or arguments) to the opcode. For example, given an opcode of MULT, it may have the operand of (a, b). The entire instruction would thus be MULT (a, b) which would mean multiply the contents of register a with the contents of register b. Where an opcode is a specific operation to be performed, the operand specifies objects on which the operation is to be performed. A given opcode may have several different operands that can be associated with the one opcode depending upon the use of the opcode. The combination of opcode and operand forms an instruction. The differing opcodes and operands between a source and target machine motivates a translation device capable of translating efficiently between a source code and a target code.

Figure 5:
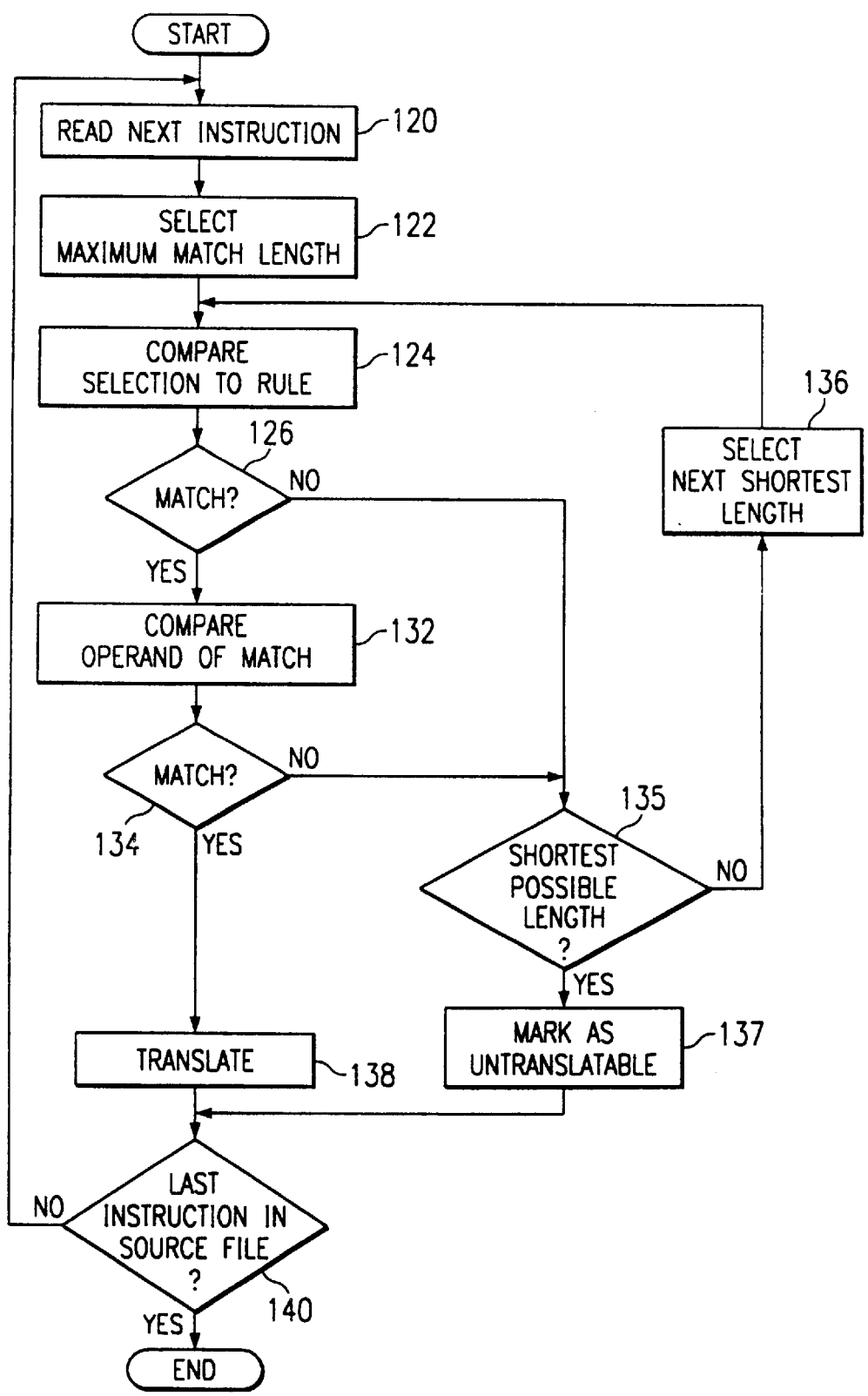
FIG. 5 is a flow diagram illustrating a method for converting source elements into translation elements using pattern matching in the translator of the translation system of FIG. 1.

FIG. 5 is a flow diagram illustrating a method for converting source elements into translation elements using pattern matching in the translator 46 of the translation system of FIG. 1. In step 120, the next source code instruction is read. The source code instruction in the source file 24 or include file 26 is read by front end 40 and analyzed by translator 46 in back end 42. As discussed previously, source machine description 32 models the source device. That is, source machine description 32 contains rules that map its operands into a device independent expression representation. Additionally, source machine description 32 contains a listing of all source opcodes. Target machine description 34 includes rules that map the device independent expressions into its operands and a listing of all target opcodes. Translation machine description 36 contains a listing of all source opcodes and a listing of all target opcodes. The lists are associated with each other such that a source opcode is associated with its corresponding target opcode. As discussed previously, one source instruction could correspond to one or many target instructions, or vice versa.

After reading in the instruction in the front end 40 in step 120, in step 122 the maximum length of a possible translation set for that instruction is selected from the translation machine description 36 by translator 46. Since more than one source opcode could translate as a set to one or more target opcodes, it is necessary to know the maximum length of a set of opcodes which begins with the opcode in the instruction read at step 120. Then, translator 46 initially reads ahead the number of opcodes in the source code corresponding to the maximum set length and compares that set of opcodes against possible target opcodes using the opcode translation rules from the translation machine description. This is the pattern matching aspect of the present invention. Next, at step 124 the source opcodes in the current set are compared to potential target opcodes. In cases where there are potentially many target opcodes associated with one source opcode, the matching step 124 would return all possible matching opcodes. Proceeding to decisional step 126, if a match exists, the Yes branch of decisional step 126 leads to step 132.

At step 132 the operand associated with the source opcode is examined to determine if there is a match between that operand and the target code operands for the potential target opcodes. In this case, the pattern matching is done by locating the expression tree representation of the source operand in the source machine description 32 and attempting to match the source expression tree representation to the target expression tree representation from the target machine description 34, which may include a number of operands for the opcode. Then, at decisional step 134, if a match exists, the Yes branch of decisional step 134 leads to step 138. At step 138, the target instruction including the matching opcode and operand is saved as the translation for the source instruction.

After the current instruction or instruction set has been translated, at decisional step 140 it is determined if the current instruction is the last instruction in the source file 24. If the instruction is the last instruction in the source file, the Yes branch of decisional step 140 leads to the end of the process, and translation is complete. If additional instructions remain to be translated in the source file 24, the No branch of decisional step 140 returns to step 120 in which the next instruction is read and then translated as previously described.

Returning to decisional step 126, if there is no match of opcodes, the No branch of decisional step 126 leads to decisional step 135. At decisional step 135, it is determined if the current set of opcodes is the shortest possible length for a set of opcodes for the instruction read at step 120. If the current set of opcodes is not of the shortest possible length, the No branch of decisional step 135 leads to step 136. At step 136, a next shortest length set of opcodes, which begins with the current opcode read in at step 120, is selected for comparison at step 124.

Returning to decisional step 135, if the current set of opcodes is of the shortest possible length for a set which begins with the current opcode, then there is no match for the current opcode on the translation machine, and the instruction including the opcode is untranslatable with current information. Accordingly, if the current set of opcodes is of the shortest possible length, the Yes branch of decisional step 135 leads to step 137. At step 137, the instruction read at step 120 is marked as untranslatable. Step 137 leads to decisional step 140 in which the process is repeated for any additional instructions in the source file 24.

Returning to decisional step 134, if a match does not exist between the source code operand and any target code operands for the potential target opcode, then the potential target opcode is not a valid translation. Accordingly, the current set of opcodes has no valid translation, and the No branch of decisional step 134 leads to decisional step 135 in which it is determined if a different opcode set is available for translation of the current opcode associated with the instruction read at step 120.

Figure 6:
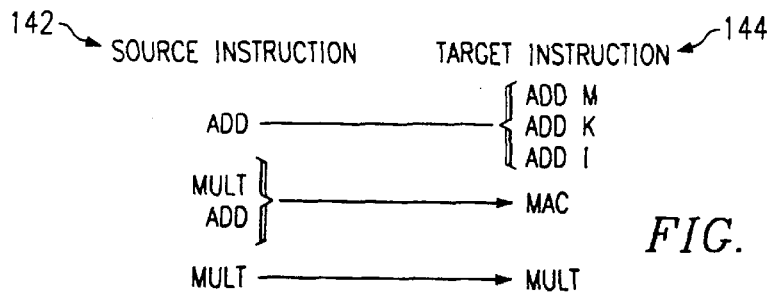
FIG. 6 is an exemplary diagram illustrating a high-level pattern matching of instructions in accordance with the method of FIG. 5.

FIG. 6 is an exemplary diagram illustrating a high-level pattern matching of instructions in accordance with the method of FIG. 5. As can be seen, the one ADD opcode from the source instruction can be translated into one of several different target opcodes, such as ADDM, ADDK, and ADDI. The selection of which is the correct target opcode is determined by what operand is associated with the source operand code in the source instruction. In the present invention, when the source opcode is compared to the target opcodes as listed in machine language description 36, all possible ADD's of the target code are selected as potential matches. The correct opcode is then determined by matching operands, as discussed above.

Also illustrated is how two opcodes, MULT and ADD, in the source opcodes can translate to a single opcode MAC in the translation. The present invention uses an iterative process to determine if related commands can be translated in to a single command on the translation machine. When translating a command such as MULT, the translator checks translation machine description 36 to see what is the largest number of source opcodes that could possibly translate to a target opcode. Assuming that the number is two, translator 46 looks ahead one more instruction to see if the combination of MULT and the next instruction matches a target opcode. If the next command is ADD, then the source opcodes of MULT and ADD would translate to the target opcode of MAC. If the next opcode was not ADD, then the next shortest match length, which, in this case is one, would be employed. This means translator 46 does not read ahead and the opcode MULT is matched with a target opcode MULT.

Figure 7:
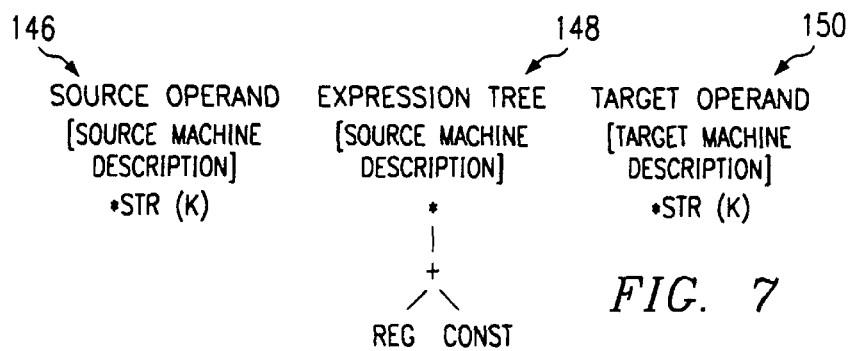
FIG. 7 is an exemplary diagram illustrating a low-level pattern matching of operands in accordance with the method of FIG. 5.

FIG. 7 is an exemplary diagram illustrating a low-level pattern matching of operands in accordance with the method of FIG. 5. A source operand, such as *str(k), can be converted into a device independent expression or representation. In one embodiment, the expression or representation can be what is commonly known as an expression tree. An expression tree breaks down an operand into basic components. As can be seen the first level of this expression tree 148 shows a star indicating direct addressing. Next, a plus sign representative of a positive offset is seen followed by REG for register and CONST for constant. This means the operand is an indirect offset of a register by a constant. The source operand is mapped to an expression tree based upon the rules in the source machine description and thus, operands, expressions and opcodes are described in source machine description 32. Similarly, the expression tree is mapped to a related target opcode based upon the rules in the target machine description and thus, operands, expressions and opcodes are described in target machine description 34.

Sometimes when translating codes between architectures the source code may use registers that do not exist in the target machine (e.g. nontranslatable registers). Special techniques can be used to successfully translate a source code under certain conditions. If the lifetime of a given register can be isolated to a single basic block, the translator may be able to translate instructions involving that register, even though the target machine has no such register. The lifetime of a register is the segment of an execution path of the code that starts from a definition of the register (e.g. an instruction writes a value into that register) and ends with the last use of the register (e.g. an instruction reads the value from that register). A basic block is the maximal sequence of code where execution only enters at the beginning and exits at the end (no branching in or out).

Figure 8:
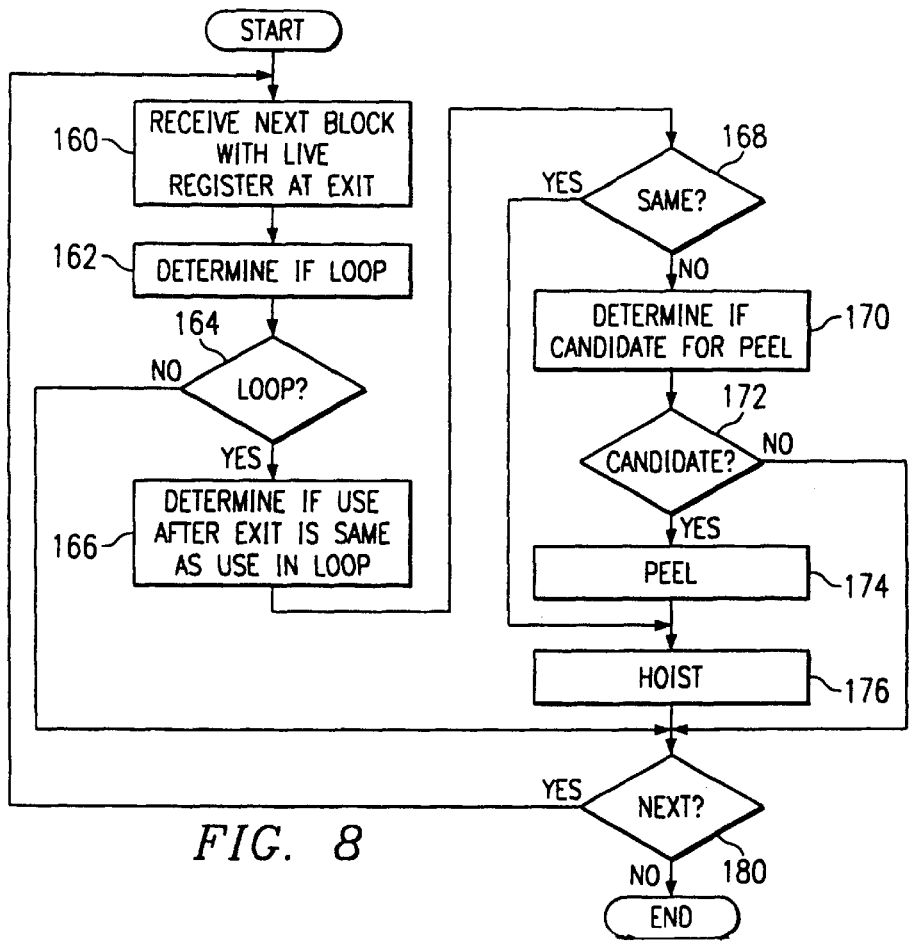
FIG. 8 is a flow diagram illustrating a method for transforming loops for translation in the transformer of the translation system of FIG. 1.

FIG. 8 is a flow diagram illustrating a method for eliminating registers in loops for translation in accordance with the teachings of the present invention. The method begins at step 160 in which the next block of the source code with a live register at the exit is reviewed. In step 162 block structure is examined to see if it is a loop structure. A full discussion of loop structure determination is discussed below in conjunction with FIG. 9. At decisional step 162, if the block is not a proper loop structure, the No branch leads to decisional step 180 where it is determined if there is any more source code to examine. If there is any remaining code to examine, the Yes branch of decisional step 180 returns to step 160 and execution starts again for a next block. If no code remains to be examined, execution ends.

Returning to decisional step 164, if a proper loop structure exists, the Yes branch leads to step 166. At step 166, it is determined if the use of the register after exit from the loop is the same as in the loop. If so, the Yes branch of decisional step 168 leads to step 176 at which loop rotation (or "hoist") is performed. Loop rotation is further discussed below in conjunction with FIG. 11. If the register is not the same, the No branch of decisional step 168 leads to step 170 in which the block is checked to see if it is a candidate for a peel iteration. In order for a peel iteration to be performed, there must only be a single entry and exit into a loop, there is no use of the register after exit from a loop, the loop count must be statically determinable and the loop count must be able to be decreased by one loop iteration. If all four criteria are fulfilled, then the Yes branch of decisional step 172 leads to step 174 at which a peel iteration is performed followed by a loop rotation in step 176. Then, execution reaches step 180 where it is determined if there is any more code to review as discussed before. Returning to decisional step 172, if the four criteria are not met, then the No branch of decisional step 172 also leads to step 180.

Figure 9:
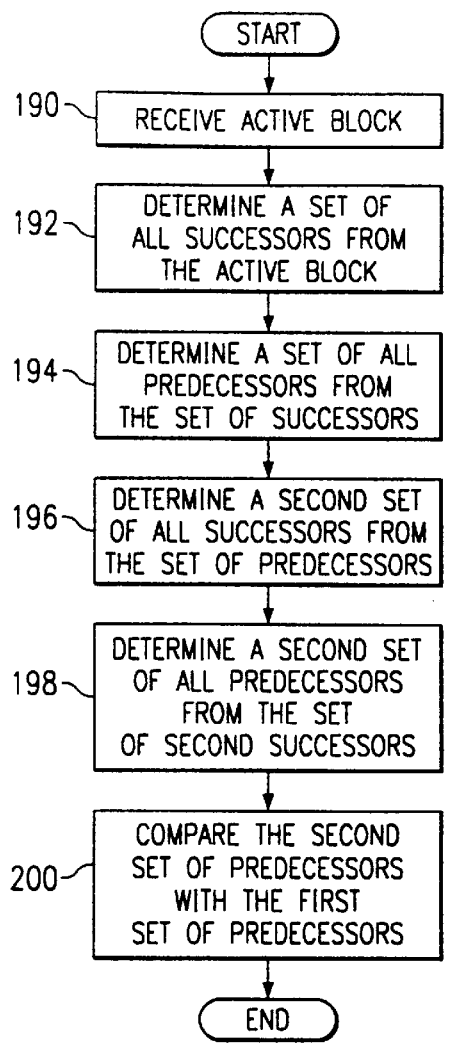
FIG. 9 is a flow diagram illustrating a method for loop identification for the method of FIG. 8.

FIG. 9 is a flow diagram illustrating a method for identifying loops in accordance with the teachings of the method of FIG. 8. In step 190, a block of source code is received where the register is active at the exit of a loop. This is known as an active block. In step 192, a set of all successors for the active block is determined. A successor block is a block that has the flow of the original block directly enter the successor block. Next, in step 194, a set of predecessor blocks to the active blocks are determined. A predecessor block is a block that has an execution flow from it to the active block.

In step 196, the successor blocks to the predecessor block are located. A second set of predecessors to the second set of successors are determined in step 198. In step 200, if the set of the first predecessors from step 194 are different from the set of the second predecessors determined in step 198, then the flow structure is not suited for loop rotation, which is an optimization for the translation. If the set of the first predecessors are the same as the set of the second predecessor, then loop rotation, discussed further in FIG. 10, can be used.

Figure 10:
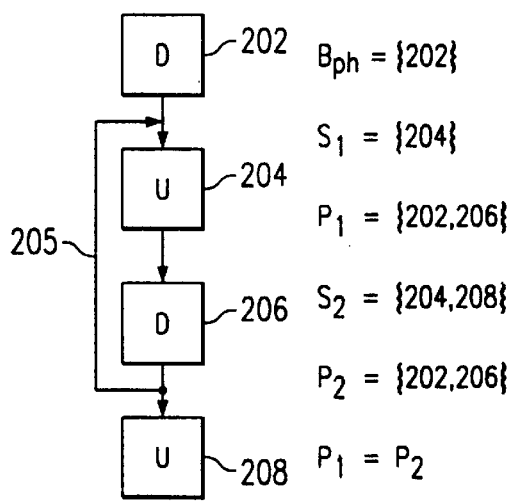
FIG. 10 is an exemplary diagram illustrating loop identification in accordance with the method of FIG. 9.

FIG. 10 is an exemplary diagram illustrating the identification of a loop. Illustrated are four blocks of code. In first block 202 a variable is defined. In second block 204 a use of that variable is defined. In third block 206 the variable is defined again, and another use of the variable is found in fourth block 208. Each block may represent one or more lines of a source code, but each are a basic block. There is a loop from third block 206 to second block 204 for a fixed number of iterations. First block 202 is also known as a pre-header block, second block 204 is also known as a header block, third block 206 is also known as a tail block and fourth block 208 is also known as a post-tail block. Using the method outlined in conjunction with FIG. 9, we can denote first block 202 as the first active block by labeling in Bph. Thus Bph={first block 202}. The successor of Bph is second block 204. Thus $S_1$={second block 204}. The set of all predecessors to successor second block 204 is first block 202 and third block 206 since both can lead to second block 204 (first block 202 directly and third block 206 via the loop). Thus, $P_1$=[first block 202, third block 206}. The successor to these predecessors are second block 204 and fourth block 208. Thus $S_2$={second block 204, fourth block 208}. Finally, the predecessors to these successors are first block 202 and third block 206. Thus $P_2$={first block 202, third block 206}. Now, both sets of predecessor are examined. Since $P_1$ and $P_2$ are identical sets the structure shown in FIG. 10 can be used with loop rotation as described in conjunction with FIG. 11.

Figure 11:
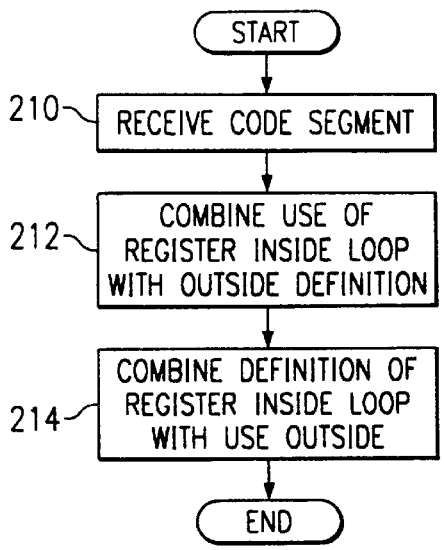
FIG. 11 is a flow diagram illustrating a method for eliminating registers by loop rotation for the method of FIG. 8.

FIG. 11 is a flow diagram illustrating a method for eliminating registers by loop rotation. In a first step 210 a proper segment of code is received. Next, in step 212 use of the register inside of the loop structure 204 is combined with the definition of the register outside the loop structure 202. The use of the register outside the loop structure 208 is combined with the definition of the register inside the loop structure 206 in step 214. This removes the lifetime of the register between the block outside of the loop 208 and the block inside the loop 206, between the last block in the loop 206 and the block outside the loop 208 and the last block in the loop 206 and the first block in the loop 204.

Figure 12:
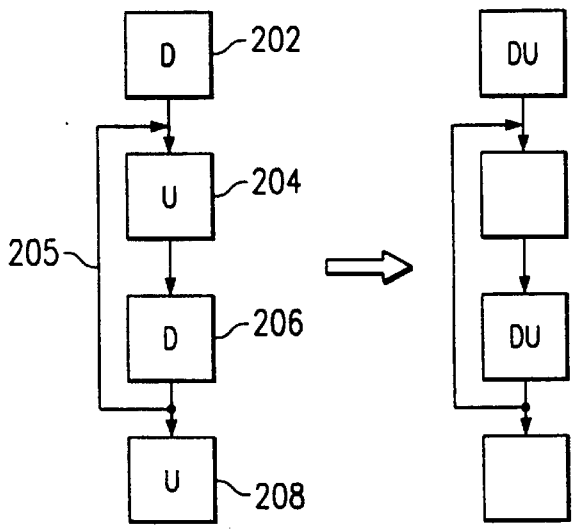
FIG. 12 is an exemplary diagram illustrating loop rotation in accordance with the method of FIG. 11.

FIG. 12 illustrates loop rotation in accordance with the method of FIG. 11 applied to the loop of FIG. 10. Illustrated is a first block 202 also known as a pre-header block where the register variable is defined. A second block 204, also known as a header block, uses the register variable. A third block 206, known as a tail block, defines the use of the register variable again. First block 202, the header block, and third block 206, the tail block, comprise the loop structure which goes from the output of the tail block, along back edge 205 to the header block. Typically, looping will occur for a set number of iterations. A fourth block 208, also known as the post-tail block, uses the register variable again. The uses in block four 208 and block two 204 are identical.

Following the method outlined in FIG. 11, the use of the variable in block two 204 can be removed from the loop and combined with the definition of the register value in first block 202. Similarly, the use of the register in block four 208 can be combined with the definition of the register in block three 206. The result removes the use of the register variable from the blocks after the loop and allows the translation of the code.

Figure 13:
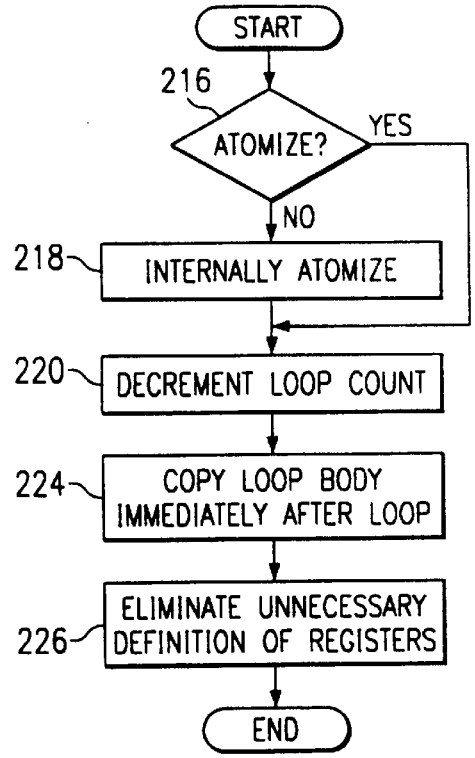
FIG. 13 is a flow diagram illustrating a method for loop peeling for the method of FIG. 8.

FIG. 13 is a flow diagram illustrating loop peeling for the method of FIG. 8. The method begins at decisional step 216 in which it is determined if the use of the register is atomized. That is, in some cases an opcode represents multiple commands and are not atomized. If use of the register is not atomized, the No branch of decisional step 216 leads to step 218. The use is internally atomized in step 218 and execution continues at step 220. If use of the register is atomized, the Yes branch of decisional step 216 leads to step 220. In step 220, the loop count is decreased by one. In step 224, one instance of the loop body is copied to immediately follow the loop. Then, in step 226 unnecessary definitions of the register can be eliminated.

FIG. 14 is an exemplary diagram of loop peeling as described in conjunction with FIG. 13. Illustrated are four basic blocks. First block 202 contains a definition for the variable to be stored in the untranslatable register (e.g. one that does not exist in the target machine). Second block 204 contains a use of the variable, while third block 206 contains another definition. There is no use of the register in fourth block 208, or what is known as the tail-end block. To peel, the loop count is decreased by one, and a copy of the interior loop is copied immediately after the end of the interior loop block 206, forming a new block 204' and a new block 206'. Now, the structure is in condition for loop rotation. The bottom two blocks are fourth box 208 which is blank and new block 206' which contains a definition of the register. Fourth box 208 is blank since it contains no instance of the untranslatable register. The definition in new block 206' may not be needed any more, and, if so, may be removed. Thus, these blocks can be eliminated. This leaves two basic blocks with no instances of the untranslatable register, and the two blocks may now be ignored for purposes of this transformation or optimization. This results in a structure having a definition in first block 202, a use of the variable in second block 204, a definition in third block 206 and a use in fourth block 204. This structure is similar to that in FIG. 12 which we already determined to be able to undergo loop rotation. Such a loop rotation is illustrated on the right-hand portion of FIG. 14.

Figure 15:
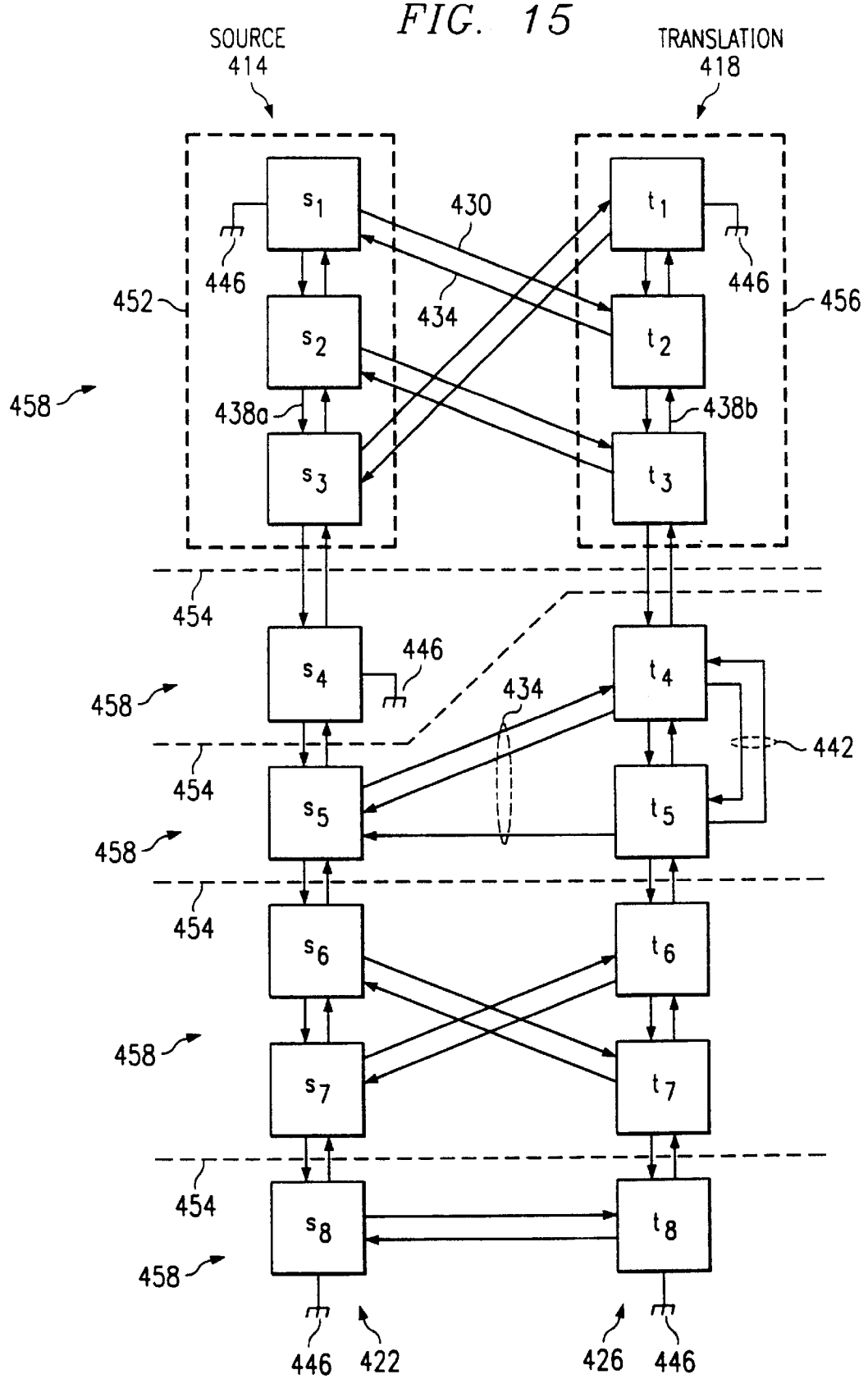
FIG. 15 is a block diagram illustrating details of the source and translation files in the display processor for the translation system of FIG. 1.

FIG. 15 is a detailed block diagram illustrating details of the source and translation files 24 and 28 in the display processor 50. As previously described, the display processor 50 generates a display of the source and translation files 24 and 28 that is output to the graphical user interface 16. In the display, corresponding groups of elements in the source and translation files 24 and 28 are aligned, source and corresponding translation instructions are associated with each other, and the source and translation files 24 and 28 are displayed side-by-side. Accordingly, an intuitive display is provided by which the user is able to efficiently review, modify, and save a translation.

Referring to FIG. 15, a source file 414 includes a plurality of source elements 422. This source file 414 is an internal representation of the source file 24 in section order. A translation file 418 includes a plurality of translation elements 426 corresponding to the source elements 422. In one embodiment, the translation file 418 is the intermediate translation file generated by the transformer 48 and passed to the display processor 50.

The source and translation elements 422 and 426 in the source and translation files 414 and 418 are associated with each other through translation 430, source 434, order 438, family 442, and null relationships 446. The relationships are generated by the translator 46 and are stored by pointers from and to the related elements 422 and 426. Exemplary source and translation elements $s_1$–$s_8$ and $t_1$–$t_8$ will be used in conjunction with FIG. 15 to explain the different relations and in conjunction with FIGS. 16–19 to explain operation of the display processor 50.

The translation relationships 430 each represent a relationship from the source element 422 to the corresponding translation elements 426 that were generated from the source element 422. Thus, one or more translation elements 426 may be generated from each source element 422. In one embodiment, the translation relationships 430 are stored by a pointer from the original source element 422 to the first corresponding translation element 426 that was generated from the source element 422. In this embodiment, as described in more detail below, the remaining translation elements 426 are associated with the first translation element 426 via the family relationship 442. For example, source element $s_1$ is related to translation element $t_2$ via the translation relationship 430.

The source relationship 434 relates the translation element 426 to the source element 422 which generated the translation element 426. Since more than one translation element 426 may be generated from a single source element 422, a plurality of translation relationships 430 may refer to a single source element 422. For example, translation elements $t_4$ and $t_5$ have the source relationship 434 to source element $s_5$.

The order relationship 438 represents the relationship between two elements in the file. A next order relation 438a represents a relationship from an element to a following element. For example, the next order relationship 438a exists between source element $s_2$ and source element $s_3$. A previous order relationship 438b represents a relationship from an element to a preceding element. For example, the previous order relationship 438b exists between the translation element $t_3$ and the translation element $t_2$.

The family relationship 442 exists between the translation elements 426 and represents that the family related 442 translation elements 426 were generated from the same source element 422. For example, the family relationship 442 between the translation element $t_4$ and the translation element $t_5$ shows that both were generated from the same source element $s_5$.

The null relationship 446 represents the lack of a relationship. The null relationship 446 typically occurs when an instruction is not needed on a target device. For example, the source element $s_4$ did not generate any translation elements 426, thus, the source element $s_4$ has the null relation 446.

The relationships between the source and translation elements 422 and 426 are used by the display processor 50 to partition the source and translation files 414 and 418 into a plurality of partitions 458. Each partition 458 has a group of source elements 452 and a group of all translation elements 456 corresponding to the group of source elements 452. As described in more detail below, the partitions 458 allow corresponding groups of source and translation elements 452 and 456 to be aligned for display to the user.

As shown in FIG. 15 a plurality of partition boundaries 454 delimit the plurality of partitions 458. The partitions 458 are each a minimal length sequence of elements such that the partition boundary 454 does not cross the translation 430 or source relationships 434. Stated another way, the partition 458 contains the minimum number of elements such that no included source element 422 or translation element 426 contains a source 434, translation 430, or family 442 related element in another partition 458.

In one embodiment, the source and translation elements 422 and 426 are partitioned by first determining a source start element in the source file 414. The source start element is determined by picking the first source element following the last source element in the previous partition 458. If no previous partition 458 has been delimited, for example, when the method is first starting, the first source element is chosen as the source start element.

A translation start element is then determined in the translation file 418. The translation start element is determined by picking the first translation element following the last translation element in the previous partition 458. If no previous partition 458 has been delimited, for example, when the method is first starting, the first translation element is chosen as the translation start element.

A translation stop element is next determined. The translation stop element is determined by choosing the last element in the translation start element's family. If the translation start element has no family relations 442, thus being the only element in the family, then the translation stop element is chosen to be the translation start element.

The translation stop element is then updated based on the last element in the family of each translation element between the translation start and stop elements. If a member of the family of the translation elements between the translation start and stop elements occurs later in the file than the current translation stop element, then the translation stop element is updated to be that later translation element. If the translation stop element changes the updating process is repeated to check that no translation element between the translation start element and the new translation stop element has a family member later than the new translation stop element.

A source stop element is then determined and updated based on the source stop element's corresponding translation elements. The source stop element is initially set to be the current source start element. If the source stop element has corresponding translation elements between the translation start and stop elements, the source stop element's corresponding translation element's family is checked. If the source stop element's corresponding translation element's family includes a member that occurs after the translation stop element, the translation stop element is updated to the last member of the source stop element's corresponding translation element's family. The source stop element is then updated to be the next source element in the source file and the method repeats.

If the source stop element's corresponding translation element is outside the translation start and stop elements, then the partition 458 has been found. The found partition 458 is delimited by the ending positions of the source and translation start and stop elements. The source and translation start elements delimit the beginning of the partition 458. The source and translation stop elements delimit the end of the partition 458. The process is repeated until the end of the source and translation files 414 and 418 is reached. At this point, the files 414 and 418 are fully partitioned into groups that can be aligned for display.

Figure 16:
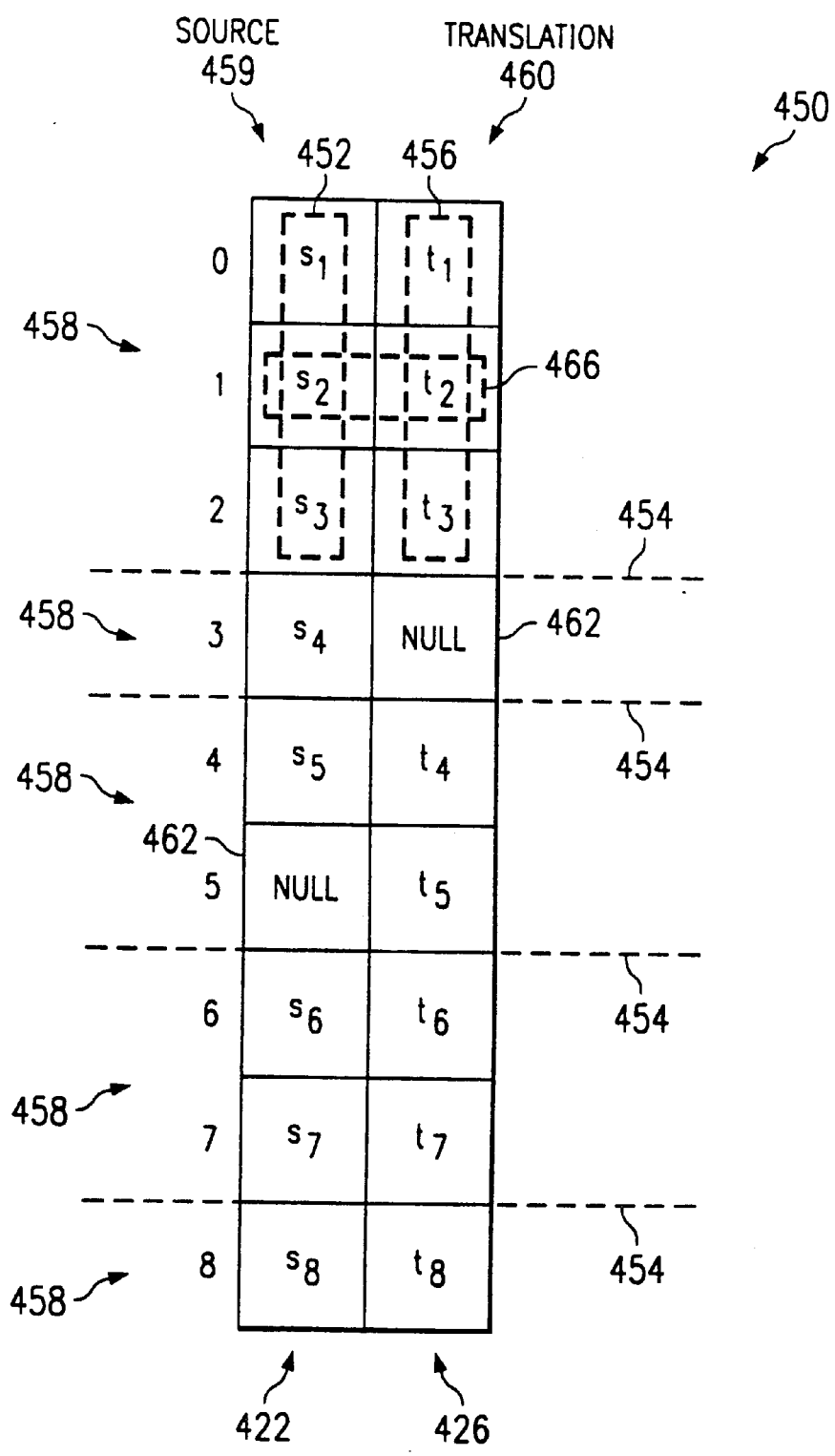
FIGS. 16–18 are block diagrams illustrating details of the display processor for the source and translation files.
Figure 17:
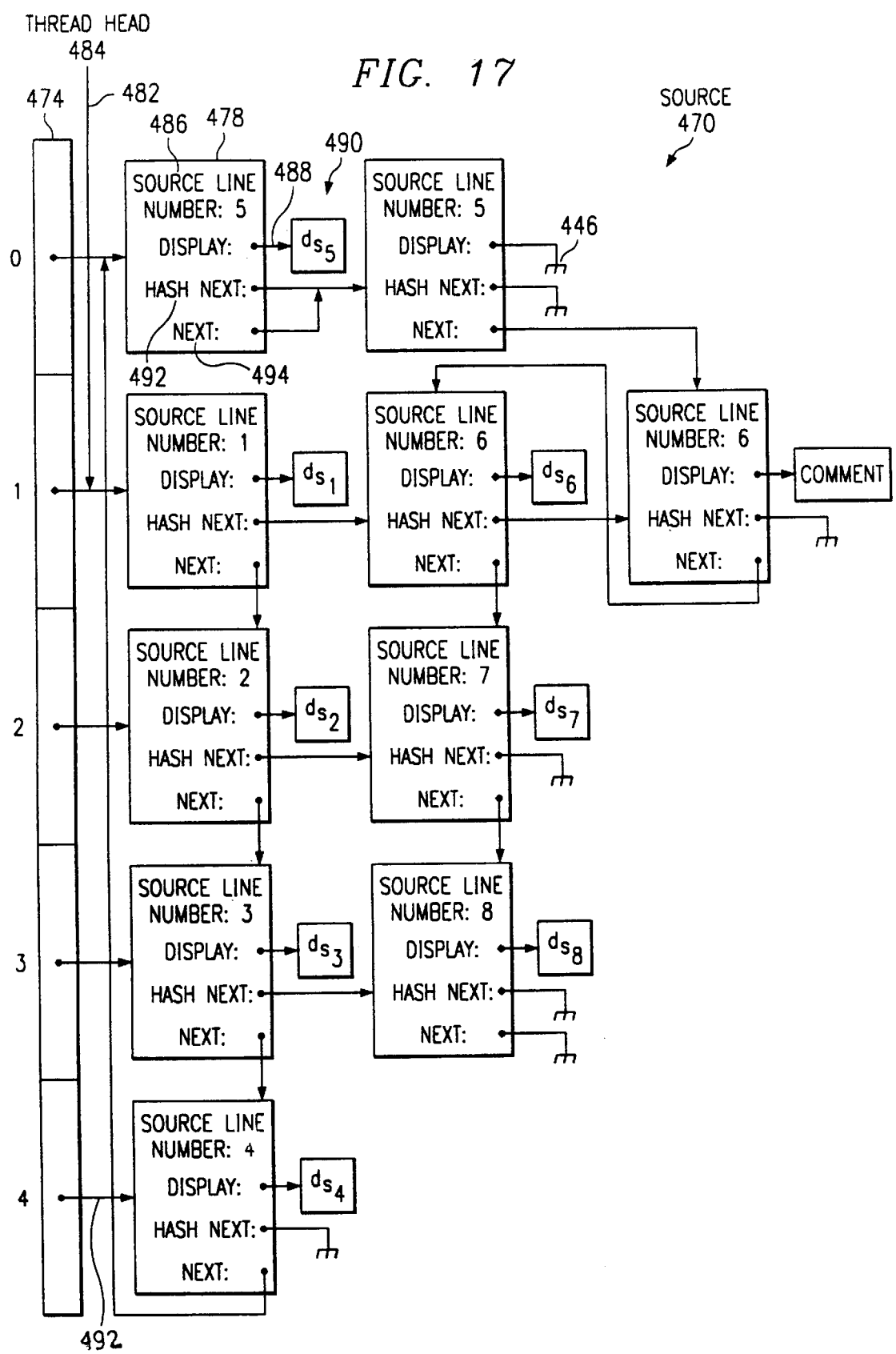
Figure 18:
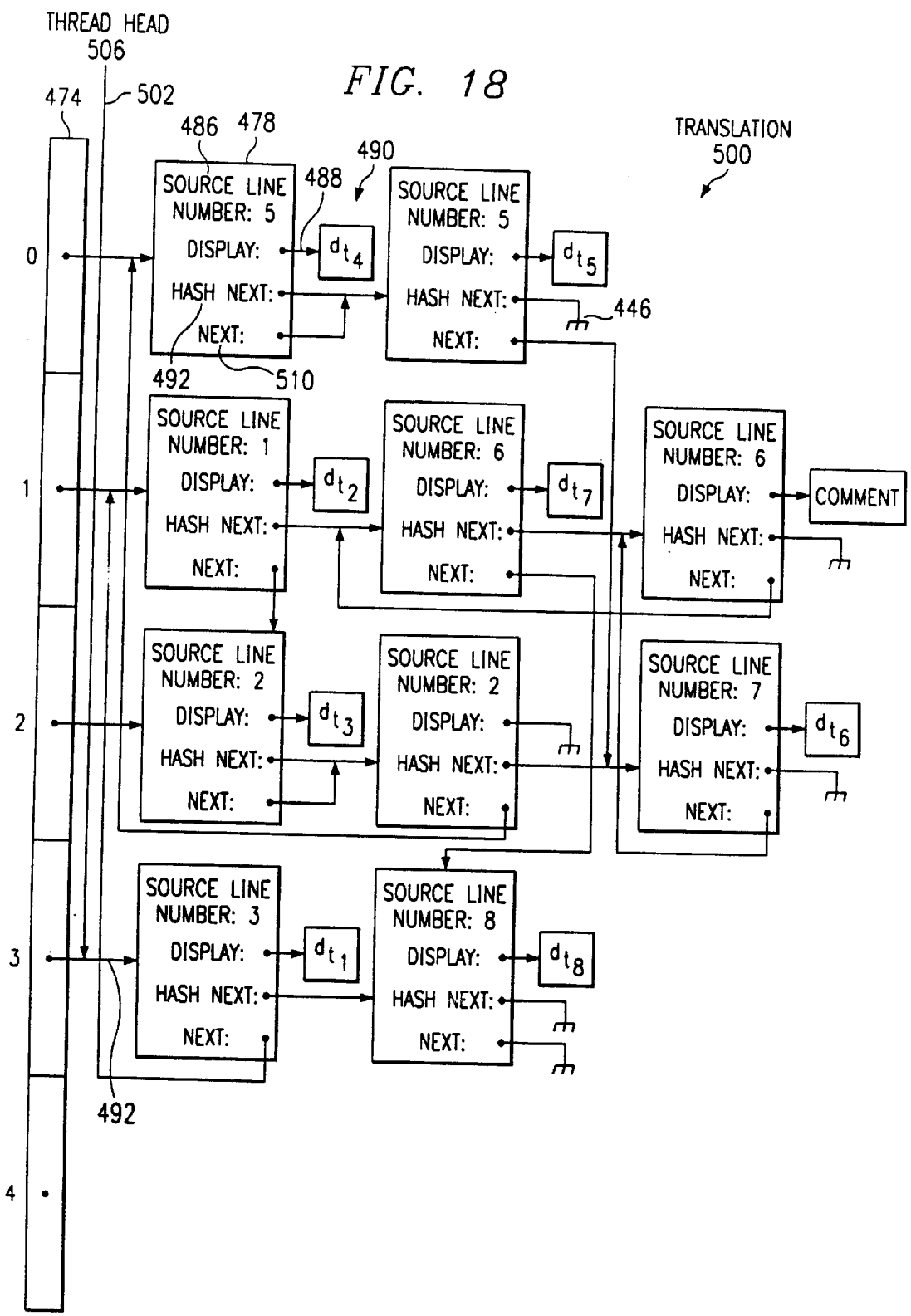

FIGS. 16–18 are a series of block diagrams illustrating details of the display processor 50 for generating a display for the source and translation files 414 and 418. Referring to FIG. 16, a correspondence map 450 is provided as a tool for aligning the corresponding groups of source and translation elements 452 and 456. The correspondence map 450 includes a plurality of pairs of source and translation groups 452 and 456. Each group includes source and translation elements 422 and 426 that are to be aligned. The correspondence map 450 also includes logical divisions at the partition boundaries 454.

In operation, the correspondence map 450 is built partition-by-partition 458. In one embodiment, the source instruction elements 422 and translation instruction elements 426 included within the groups 452 and 456 are aligned in the correspondence map 450 in such a way that the distance between corresponding source and translation instruction elements, 422 and 426, is minimized while maintaining original source and translation order. In this embodiment, minimal distance does not require the related source instruction elements 422 and translation instruction elements 426 be adjacent to or horizontally aligned with each other. The distance minimization heuristic maintains the correct order of both the source elements 422 and the translation elements 426. For example, the correspondence map 450 in FIG. 16 shows source element $s_1$ horizontally aligned with translation element $t_1$ even though source element $s_1$ actually generated the translation element $t_2$, as shown in FIG. 15. Once all the instruction elements in the partition 458 have been added to the correspondence map 450, null elements 462 may be added to the partition 458 to equalize the number of elements in the source group 452 and the translation group 456 that the partition 458 delimits. For example, the null elements 462 shown in FIG. 16 serve to equalize the number of instruction elements in the source group 452 and the corresponding translation group 456 in two of the partitions 458.

Referring to FIG. 17, a source hash table 470 is used for the insertion of comments and to provide for efficient storage and lookup of source display entries. The source hash table 470 contains a plurality of buckets 474 and a plurality of hash entries 478. The buckets 474 contain a plurality of hash next pointers 492. The number of buckets is dependent on a hash function. The source hash table 470 also contains a source display order thread 482. The source display order thread 482 includes a source display order thread head 484 and a display order thread next pointer 494 included within the hash entry 478. The hash entries 478 include a source line number 486, a display entry pointer 488, the hash next pointer 492, and the display order thread next pointer 494. The display entry pointer 488 refers to a display entry 490. The source line number 486 is computed from the line number in the source file 24 which is related to the information in the display entry 490. The display entry 490 includes the text that is to be displayed for the display entry 490 and the source line number 486. The hash next pointer 492 refers to the next hash entry 478 in the bucket 474. The display order thread next pointer 494 refers to the next entry in the display order thread for the hash table.

The source hash table 470 operates as follows. A correspondence map line 466 (see FIG. 16) from the correspondence map 450 is received. The line 466 contains the source element 422 and the translation element 426. The source element 422 is inserted into the source hash table 470, while the handling of the translation element 426 will be more fully described in association with FIG. 18. To insert the source element 422 into the source hash table 470 the display entry 490 is first created for the source element 422. If the display entry 490 is to be associated with the null element 462 then the display entry 490 will be replaced by the null relation 446 (see FIG. 15). The display entry 490 includes the appropriate text to be displayed for the source element 422 and the source line number 486 with which the source element 422 is associated. The display entry 490 is then associated with the display entry pointer 488 in the hash entry 478. The hash entry 478 will also include the source line number 486 with which the source element 422 is associated.

The hash entry 478 will then be inserted into the source hash table 470 in the appropriate bucket 474. The appropriate bucket 474 is determined by the hash function. The hash function will map a key value to a particular number. In the source hash table 470, the key for the hash function is the source line number 486 contained within the hash entry 478. The hash function shown in FIG. 17 takes the source line number 486 and computes modulo 5 on it. Modulo means to do integer division and return the remainder as the result. The result of the source line number 486 modulo 5 is the appropriate bucket 474 for the inserted hash entry 478.

Inserting the hash entry 478 involves updating the appropriate hash next pointer 492. If the hash entry 478 is the first to be inserted into the bucket 474, the hash next pointer included in the bucket 474 is updated to be associated with the hash entry 478. If the hash entry 478 is not the first to be inserted into the bucket 474, the hash next pointer 492 of the previous hash entry 478 inserted in the bucket 474 is updated to be associated with the inserted hash entry 478.

After the hash entry 478 is inserted into the appropriate bucket 474, the source display order thread 482 is updated. If the hash entry 478 is the first hash entry 478 to be inserted into the source hash table 470, the source display order thread head 484 is associated with the hash entry 478. If the hash entry 478 is not the first hash entry 478 to be inserted into the source hash table 470, then the display order thread next pointer 494 of the previously inserted hash entry 478 is associated with the hash entry 478. The source display order thread 482 tracks the proper order that the display entries 490 are to be displayed in for the source elements 422. The source display order thread 482 allows the source elements 422 to be displayed in proper order regardless of the location of the display entry's 490 associated hash entry 478. This process is performed for every correspondence map line 466.

Referring to FIG. 18, a translation hash table 500 is used for the insertion of comments and to provide for efficient storage and lookup of translation display entries. The operation of the translation hash table 500 is substantially similar to the operation of the source hash table 470 except that the display entries 490 are created from the translation elements 426. The display entries 490 and hash entries 478 of the translation hash table 500 use as the source line number 486 the line number of the source element 422 that generated the translation element 426 associated with the display entry 490. The translation display order thread 502 allows the translation elements to be displayed in proper order regardless of the location of the display entry's 490 associated hash entry 478.

FIGS. 19A and 19B are a flow diagram illustrating a method for generating a display in the display processor 50. Referring to FIG. 19A, the method begins at step 610 in which the source file 414 and the translation file 418 are received by the display processor 50. As previously described, the source file 414 is received from the front end 40 and the translation file 418 is received from the transformer 48. The source and translation files 414 and 418 are section ordered and already have the translation relationships 430, source relationships 434, order relationships 438, family relationships 442, and null relationships 446 established.

Proceeding to step 614, the source and translation files 414 and 418 are partitioned into the plurality of partitions 458. Each partition 458 has a group of source elements 422 and a group of all translation elements 426 corresponding to the group of source elements 422.

Next, at step 618, the correspondence map 450 is generated. In one embodiment, the correspondence map 450 is generated by inserting all the instruction elements of a given partition 458 such that the distance between the related instruction elements is minimized. The related instruction elements are any source instruction elements 422 or translation instruction elements 426 that contain any of the relationships, except the null relationship 446, between them. The minimum distance heuristic preserves the order of the instruction elements as they appeared in the files. Thus, as instruction elements are inserted into the correspondence map 450 the source instruction elements 422 may not line up horizontally with the source instruction element's 422 related translation instruction elements 426.

Next, at step 622, null elements 462 are inserted to equalize the number of elements in the partitions 458 of the source and translation groups 452 and 456 of the correspondence map 450. While inserting null elements 462 an effort is made to align source elements 422 with related translation elements 426. Again, source elements 422 and related translation elements 426 may not align exactly.

Then, at step 624, a hash table loop is entered which includes steps 624, 628, 632, 636, 640, 644, and 648. The loop begins at step 624 with the display processor 50 receiving the correspondence map line 466. If this is the first iteration of the loop, the correspondence map line 466 received is the first line of the correspondence map 450. Otherwise, it is the line immediately following the correspondence map line 466 that has just been handled. Each correspondence map line 466 includes a horizontally aligned pair of source elements 422 and translation elements 426. Next, at step 628, display entries 490 are created for the source element 422 and the translation element 426 in the correspondence map line 466 received at step 624. The display entry 490 for the source element 422 is then inserted into the source hash table 470 at step 632. At step 636 the source hash table display order thread 482 is updated as described previously with reference to FIG. 17.

Next, at step 640, the display entry 490 created for the translation element 426 is associated with the display entry pointer 488 included within the hash entry 478 that the display entry 490 is associated with. The hash entry 478 is then inserted in the appropriate bucket 474 in the translation hash table 500.

Then, at step 644, the translation hash table display order thread 502 is updated. The operation of the translation hash table display order thread 502 is similar to the operation of the source hash table display order thread 482 and operates in the manner previously described with reference to FIG. 18.

Proceeding to decisional step 648, the display processor 50 determines if further correspondence map lines 466 are to be inserted into the hash tables 470 and 500. If more correspondence map lines 466 need to be handled, the Yes branch of decisional step 648 returns to step 624 and receives the next correspondence map line 466. If no more correspondence map lines 466 need to be inserted, the No branch of decisional step 648 exits the hash table loop and proceeds to step 652.

At step 652, a comment insertion loop including steps 652, 656, 660, 664, 668, 672, 676, and 680 is entered. In step 652 a line from the source file 414 is received. The line from the source file 414 will include either an instruction or comment. At decisional step 656, a check is made on the line, and if the line includes a comment, then a display entry 490 is created for the comment at step 660. The display entry 490 is then buffered at step 660 and a loop back to step 652 occurs where the next line from the source file 414 is received. If the source file line does not include a comment, it includes an instruction and the method continues on to step 664. The decisional step 656 may have additional determinations to handle a variety of differing types of elements.

Next, at step 664, the display entries 490 that were buffered at step 660, if any, are inserted into the source hash table 470. The instruction line from the source file 414 that moved the method from step 656 to step 664 has an associated line number that is the source line 486 used in creating the hash entries 478 for the buffered display entries at step 660. The source hash table display order thread 482 is then updated at step 668. The result of the buffering at step 660, the insertion at step 664, and the update at step 668 is that the comments that were buffered at step 660 have been keyed to the line number of the source element 422 that the comments precede. Thus resulting in the display of the comments associated with the source element 422 just prior to the display of the source element 422.

Then, at step 672, the display entries buffered at step 660 are inserted into the translation hash table 500. The hash entries 478 created for inserting the comments into the translation hash table 500 use as the source line number 486 the line number of the instruction that transitioned the method from step 656 to step 664. Then, at step 676, the translation hash table display order thread 502 is updated. The translation hash table display order thread 502 is updated in such a manner as to place the hash entries 478 including display entries 490 for the comments buffered in step 660 prior to the hash entry 478 associated with the display entry 490 for the translation element 426 generated from the source element 422. Thus, the comments associated with the instruction in the source file 414 are displayed just prior to the translation element 426 that the source instruction generated. Because an equal number of comment lines are added to each of the hash tables 470 and 500, the corresponding group of source and translation elements remain aligned.

Next, at decisional step 680, the buffer utilized in step 660 is reset. Then, a check is made to see if there are more lines to be checked in the source file 414. If lines remain in the source file 414 that need to be checked, the Yes branch of decisional step 680 returns to step 652 and the next source file line is received. If there are no more lines remaining in the source file 414 to be checked for comments, the No branch of the decisional step 680 proceeds to step 684 and exits the comment insertion loop.

Referring now to FIG. 19B, at step 684, a display partners loop including step 684, 688, 696 and 700 is entered. Steps 684 and 688 represent a lock-step traversal of the source and translation hash table display order threads 482 and 502. The lock-step traversal represents an entry-by-entry traversal of the display order threads 482 and 502 using the hash entries 478 to find successive lines. As shown in steps 684 and 688, when the next hash entry 478 is stepped to in the source hash table 470, the next hash entry 478 is stepped to in the translation hash table 500.

Next, at step 696, the source and translation hash entries 478 are inserted into a display partners list 514. The display partners list 514 is a list of pairs of display entries 490 that are meant to be displayed on the same line. There will be an entry in the display partners list 514 for every pair of display entries 490. The pair of display entries 490 include one display entry 490 from the source hash table 470 and one display entry from the translation hash table 500.

Then, at decisional step 700, a check is made to see if there are any further display entries 490 in the source and translation hash table display order threads 482 and 502. If further display entries 490 exist, then the Yes branch of decisional step 700 returns to step 684 and the next entry in the source and translation hash table display order threads 482 and 502 are added to the display partners list. If no more display entries 490 are in the threads 482 and 502, the No branch of decisional step 700 exits the display partners loop and proceeds to step 704.

At step 704, the source file 414 is opened at its beginning. Then, at step 708, the line number of the next line in the source file 414 is received and a display line list loop including steps 708, 712, 716, 720, and 724 is entered. If the source file 414 has just been opened in step 704 then the next line number is the first line number in the source file 414. If the source file has not just been opened at step 704 then the next line number is the line number immediately following the line number that was just handled.

Proceeding to step 712, the line number received from the source file 414 and step 708 is used to find the display entries 490 associated with that line number in the source hash table 470. Once the plurality of display entries 490 associated with the line number have been found in the source hash table 470, the display pairs for those display entries 490 are found in the display partners list 514 at step 716.

Next, at step 720, the display entries 490 found at step 712 and 716 are added to a display line list 518. The display line list 518 is created to facilitate the display of source and translation elements 422 and 426 in source file order as opposed to section order. When the front end 40 originally parsed the source file 414 the source elements 422 were ordered by section. However, in one embodiment, a goal is to display the source and translation elements 422 and 426 in an order dictated by the order of the source instructions found in the unsectioned source file, thus, the display is reordered from the section based order to the unsectioned order. Then, at decisional step 724, a check is made to see if the end of the unsectioned source file has been reached. If the end of the unsectioned source file has not been reached, and further lines need to be handled from the source file, the No branch of decisional step 724 returns to step 708 and the next line number is received from the unsectioned source file. If the end of the unsectioned source file has been reached then the Yes branch of decisional step 724 exits the display line loop and proceeds to step 728.

At step 728, the display line list 518 is passed to the graphical user interface 16 for display to the user. As previously described, the display processor 50 generates a display of the source and translation files 24 and 28 that is output to the graphical user interface 16. In the display, corresponding groups of elements in the source and translation files 24 and 28 are aligned, source and corresponding translation instructions are associated with each other, and source and translation files 24 and 28 are displayed side-by-side, as illustrated in FIG. 3. Accordingly, an intuitive display is provided by which the user is able to efficiently review, modify and save a translation.

FIG. 20 is a flow diagram illustrating a method for translating include files 26 accessed by the source file 24. As previously described, an include file 26 typically includes code to perform (or performs) an operation used by a number of files and is therefore most efficiently programmed as a separate file that can be used or called by any number of files.

Referring to FIG. 20, the method begins at step 814 in which a source include file 26 is received from the graphical user interface 16. The source include file 26 is received upon selection of the source include file 26 by the user or other suitable event.

Proceeding to step 830, the source include file 26 is translated into the translation include file 30. The source include file 26 is translated by the translation tool 14 as previously described in connection with the source file 24. Accordingly, the source include file 26 is parsed by the front end 40 and then analyzed and translated by the back end 42.

Then, at step 832, in the back end 42, the display processor 50 generates a display similar to that for the source and translation files 24 and 28. Accordingly, corresponding groups of elements in the source and translation include files 26 and 30 are aligned, corresponding instructions are associated with each other, and the source and translation files are displayed side-by-side. In addition, problematic or other elements to be reviewed by the user are indicated with the status icons and listed in an output window.

Next, at state 834, the source and translation include files 26 and 30 are displayed by the graphical user interface 16 for review and modification by the user. In response to user modifications received by the graphical user interface 16, state 834 returns to step 830 in which the source elements are reanalyzed and retranslated based on the user modification.

After the user has performed all of the user's desired manipulations on the displayed information, state 834 leads to step 838. The translated version of the source include file 26 is saved as the translation include file 30. The translation include file 30 includes the plurality of translation elements 426 corresponding to the elements in the source include file 26. A translation include file name is specified by the user when the translation include file 30 is saved or otherwise associated with the translation include file 30.

Proceeding to step 850, the translation include file name specified by the user in step 838 is propagated back to the graphical user interface 16. The translation include file name is incorporated into the translation file 28 as the include file in the translation file 28 associated with the source include file name in the source file 24.

Thus, it may be seen that the present invention provides a translation system having a front end 40 and a back end 42. The front end 40 identifies source elements in a source file 24. The back end 42 generates a translation file 28 having translation elements corresponding to translation of the source elements and has an interface for receiving inputs for modifying said translation.

Although the present invention has been described using several embodiments, various changes and modifications may be suggested to one skilled in the art after a review of this description. It is intended that the present invention encompass such changes and modifications as fall within the scope of the appended claims.

What is claimed is:

1. A method for translating a source file for a source processing unit to a target file for a target Processing unit, the method comprising:

reading in a source instruction;

matching an opcode of a source instruction to an opcode of a target instruction by comparing the source opcode to possible target opcodes;

converting the operand of the source instruction by comparing the operand of the source instruction represented by a generic expression to the generic expression related to a target operand and combining the target opcode and the target operand to form a translated target instruction.

2. The method of claim 1, wherein the generic expression is a tree diagram representation of an operand.

3. The method of claim 1, wherein the step of matching an opcode further comprises choosing a target opcode from a group of potential target opcodes by comparing the target opcode and target operand with the source opcode and source operand.

4. The method of claim 1, wherein the step of matching an opcode further comprises the step of combining two or more source opcodes to a single target opcode when there is a target opcode that represents the two or more source code opcodes.

5. The method of claim 1, wherein a translation machine description stores a list of source opcodes and the corresponding target opcodes.

6. The method of claim 1, wherein a source machine description stores a list of source instructions and a list of source operands associated with a generic expression of the source operand.

7. The method of claim 1, wherein a target machine description stores a list of target instructions and a list of target operands associated with a generic expression of the target operand.

8. The method as recited in claim 1, wherein an untranslatable source element is identified.

9. A system for translating a source instruction for a source processing unit into a target instruction for a target processing unit, the system comprising:

a translator operable to perform context-based translation including:

a translation machine description operable to store a list of source opcodes and a corresponding list of target opcodes;

a source description having a list of source opcodes and a list of source operands associated with a generic representation of the source operands and a target description having a list of target opcodes and a list of target operands associated with a generic representation of the target operands, wherein the translator is operable to receive a source instruction, utilize the translation machine description, source description, and target description to translate the source instruction into the target instruction.

10. The system of claim 9, wherein the generic expression is a diagram or pattern representation of an operand.

11. The system of claim 9, wherein a target opcode is chosen from a group of potential target opcodes by comparing the target opcode and target operand with the source opcode and source operand.

12. The system of claim 9, wherein two or more source opcodes can be converted to a single target opcode when there is a target opcode that represents the two or more source code opcodes.

13. The system as recited in claim 9 wherein an untranslatable source instruction is identified by the translator.

* * * * *